US010997629B2

(12) United States Patent
Friborg, Jr.

(10) Patent No.: US 10,997,629 B2
(45) **Date of Patent: *May 4, 2021**

(54) SYSTEMS AND METHODS FOR MESSAGE ALERTS AND REFERRALS

(71) Applicant: Zeta Global Corp., New York, NY (US)

(72) Inventor: George Vincent Friborg, Jr., Wyndmoor, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/680,871

(22) Filed: Nov. 12, 2019

(65) Prior Publication Data

US 2020/0082441 A1 Mar. 12, 2020

Related U.S. Application Data

(63) Continuation of application No. 16/210,691, filed on Dec. 5, 2018, now Pat. No. 10,546,325, which is a
(Continued)

(51) Int. Cl.
*G06Q 30/02* (2012.01)
*H04L 12/58* (2006.01)
(Continued)

(52) U.S. Cl.
CPC ......... *G06Q 30/0267* (2013.01); *H04L 51/14* (2013.01); *H04M 3/4878* (2013.01); *H04W 4/12* (2013.01)

(58) Field of Classification Search
CPC ...................................................... G06Q 30/02
See application file for complete search history.

(56) References Cited

U.S. PATENT DOCUMENTS 7,092,509 B1 8/2006 Mears et al.
8,775,539 B2 7/2014 Heikes et al.
(Continued)

FOREIGN PATENT DOCUMENTS

WO WO96/20553 * 7/1996 .............. H04M 3/50

OTHER PUBLICATIONS

Y.M. Wang, P. Bahl, W. Russell, The SIMBA user alert service architecture for dependable alert delivery (English), 2001 International Conference on Dependble Systems and Networks (pp. 463-472), Jan. 1, 2001 (Year: 2001).*
(Continued)

*Primary Examiner* — Marilyn G Macasiano
(74) *Attorney, Agent, or Firm* — Candice Hebden Osnato; Piers Blewett

(57) ABSTRACT

A system comprising a computer-readable storage medium storing at least one program, and a computer-implemented method for referring contacts to receive text message alerts. An accounts module receives first user data including an indicator that a first user requested to subscribe to receive text messages alerts. The account module adds, based at least on the received first user data, a first user account to a database of subscribers. A message generator module generates, using the processor in response to receiving the first user data, a first text message corresponding to an offer to subscribe to receive text message alerts. A communication module transmits to the first user the first text message corresponding to the offer to subscribe to receive text message alerts. The transmitted first text message can be forwarded to a second user.

17 Claims, 14 Drawing Sheets

Related U.S. Application Data continuation of application No. 14/166,698, filed on Jan. 28, 2014, now Pat. No. 10,204,358.

(60) Provisional application No. 61/832,660, filed on Jun. 7, 2013.

(51) Int. Cl.

| | |
|---|---|
| ***H04M 3/487*** | (2006.01) |
| ***H04W 4/12*** | (2009.01) |

(56) References Cited

U.S. PATENT DOCUMENTS

| | | | | |
|---|---|---|---|---|
| 9,058,624 | B1 | 6/2015 | Krishnamurthy | |
| 10,204,358 | B2 | 2/2019 | Friborg, Jr. | |
| 2006/0047568 | A1 | 3/2006 | Eisenberg et al. | |
| 2006/0047572 | A1 | 3/2006 | Moore et al. | |
| 2007/0150588 | A1 | 6/2007 | Ghadialy et al. | |
| 2007/0265006 | A1 | 11/2007 | Washok et al. | |
| 2007/0282795 | A1 | 12/2007 | Mashinsky | |
| 2008/0147863 | A1 | 6/2008 | Evanchik et al. | |
| 2009/0028183 | A1 | 1/2009 | Landers et al. | |
| 2010/0113072 | A1 | 5/2010 | Gibson et al. | |
| 2010/0223097 | A1 | 9/2010 | Kramer et al. | |
| 2010/0241535 | A1 | 9/2010 | Nightengale et al. | |
| 2011/0106622 | A1 | 5/2011 | Kuhlman et al. | |
| 2011/0178897 | A1 | 7/2011 | Balasubramanian et al. | |
| 2012/0084164 | A1 | 4/2012 | Hammad et al. | |
| 2012/0095834 | A1 | 4/2012 | Doig et al. | |
| 2013/0091274 | A1 | 4/2013 | Fanto et al. | |
| 2013/0124192 | A1 | 5/2013 | Lindmark et al. | |
| 2013/0159446 | A1 | 6/2013 | Carlson et al. | |
| 2014/0039995 | A1* | 2/2014 | Ngo | G06Q 50/01 705/14.16 |
| 2014/0279564 | A1 | 9/2014 | Dyer et al. | |
| 2014/0365586 | A1 | 12/2014 | Friborg, Jr. | |
| 2015/0213503 | A1 | 7/2015 | Friborg, Jr. | |
| 2019/0108549 | A1 | 4/2019 | Friborg, Jr. | |

OTHER PUBLICATIONS

"U.S. Appl. No. 14/166,661, Advisory Action dated Nov. 23, 2016", 3 pgs.
"U.S. Appl. No. 14/166,661, Final Office Action dated Sep. 8, 2016", 21 pgs.
"U.S. Appl. No. 14/166,661, Final Office Action dated Nov. 1, 2017", 25 pgs.
"U.S. Appl. No. 14/166,661, Non Final Office Action dated Mar. 13, 2017", 21 pgs.
"U.S. Appl. No. 14/166,661, Non Final Office Action dated Apr. 8, 2016", 21 pgs.
"U.S. Appl. No. 14/166,661, Response filed Jul. 13, 2017 to Non Final Office Action dated Mar. 13, 2017", 13 pgs.
"U.S. Appl. No. 14/166,661, Response filed Aug. 8, 2016 to Non Final Office Action dated Apr. 8. 2016", 13 pgs.
"U.S. Appl. No. 14/166,661, Response filed Nov. 7, 2016 to Final Office Action dated Sep. 8, 2016", 10 pgs.
"U.S. Appl. No. 14/166,698, Advisory Action dated Aug. 16, 2018", 3 pgs.
"U.S. Appl. No. 14/166,698, Examiner Interview Summary dated Jan. 26, 2018", 3 pgs.
"U.S. Appl. No. 14/166,698, Final Office Action dated Jun. 1, 2018", 22 pgs.
"U.S. Appl. No. 14/166,698, Final Office Action dated Aug. 25, 2016", 24 pgs.
"U.S. Appl. No. 14/166,698, Non Final Office Action dated May 5, 2017", 23 pgs.
"U.S. Appl. No. 14/166,698, Non Final Office Action dated Nov. 16, 2017", 25 pgs.
"U.S. Appl. No. 14/166,698, Non Final Office Action dated Dec. 4, 2015", 16 pgs.
"U.S. Appl. No. 14/166,698, Notice of Allowance dated Sep. 20, 2018", 9.
"U.S. Appl. No. 14/166,698, Response filed May 4, 2016 to Non Final Office Action dated Dec. 4, 2015", 21 pgs.
"U.S. Appl. No. 14/166,698, Response filed Aug. 1, 2018 to Final office Action dated Jun. 1, 2018", 21 pgs.
"U.S. Appl. No. 14/166,698, Response filed Dec. 27, 2016 to Final Office Action dated Aug. 25, 2016", 20 pgs.
"U.S. Appl. No. 14/166,698, Response filed Feb. 2, 2018 to Non Final Office Action dated Nov. 16, 2017", 12 pgs.
"U.S. Appl. No. 16/210,691, Non Final Office Action dated Sep. 20, 2019", 7 pgs.
"U.S. Appl. No. 16/210,691, Notice of Allowance dated Oct. 25, 2019", 8 pgs.
"U.S. Appl. No. 16/210,691, Response filed Sep. 25, 2019 to Non-Final Office Action dated Sep. 20, 2019", 9 pgs.
"LiveOps Social™ : Listen and engage with today's social and mobile customers", [Online]. Retrieved from the Internet: <URL: http://www.liveops.com/product/sms-text-messaging-crm>, (Accessed Jun. 10, 2015), 2 pgs.
"LiveOps: Transforming Customer Interactions in the Social Enterprise", [Online]. Retrieved from the Internet: <URL: https://www.youtube.com/watch?v=4twqwhFowYE>, (May 25, 2012), 2 pgs.
Lowensohn, Josh, "Kwiry puts Netflix, Amazon in your pocket—CNET", © CBS Interactive Inc., [Online]. Retrieved from the Internet: <URL: http://www.cnet.com/news/kwiry-puts-netflix-amazon-in-your-pocket/>, (Aug. 12, 2008), 3 pgs.

* cited by examiner

SYSTEMS AND METHODS FOR MESSAGE ALERTS AND REFERRALS

PRIORITY CLAIM AND CROSS-REFERENCE TO RELATED APPLICATIONS

The present application is a continuation of U.S. patent application Ser. No. 16/210,691 filed Dec. 5, 2018, which is a continuation of U.S. patent application Ser. No. 14/166,698 filed Jan. 28, 2014, which application claims the benefit under 35 U.S.C. 119(e) of U.S. Provisional Patent Application Ser. No. 61/832,660, filed Jun. 7, 2013, which are incorporated herein by reference in their entireties. This present application is also related to U.S. patent application Ser. No. 14/166,661, filed Jan. 28, 2014 titled SYSTEMS AND METHODS FOR RETARGETING TEXT MESSAGE ALERTS, incorporated by reference in its entirety.

TECHNICAL FIELD

Example embodiments of the present application generally relate to text messaging and, more particularly in one embodiment, to a system and method for providing text message alerts.

BACKGROUND

Marketplaces can be online and/or real world (e.g., brick and mortar). Online marketplaces can include websites or mobile applications where users may buy or sell goods or services (referred to collectively as "items") from a provider of the online marketplace or other users of the online marketplace. The goods or services (referred to collectively as "items") are described in a published listing. Similar to online marketplaces, real-world marketplaces may have websites that allows users to view inventory or interact with the real-world marketplace. Any of these online browsing environments may serve online advertisements to users during the course of their pursuits of online activities.

One approach for providing consumers with advertisements is by serving email advertisements. Another form of advertisements is online banner advertisements that may be displayed on various webpages, including webpages on third party websites. Accordingly, consumers can be exposed to a variety of advertisements throughout the consumers' online experience. Given the rapid increase in the number of online marketplaces, customers may become overwhelmed by the number of shopping options and online advertisements. As a result, some marketplaces may not be able to effectively market to consumers.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

Figure 1:
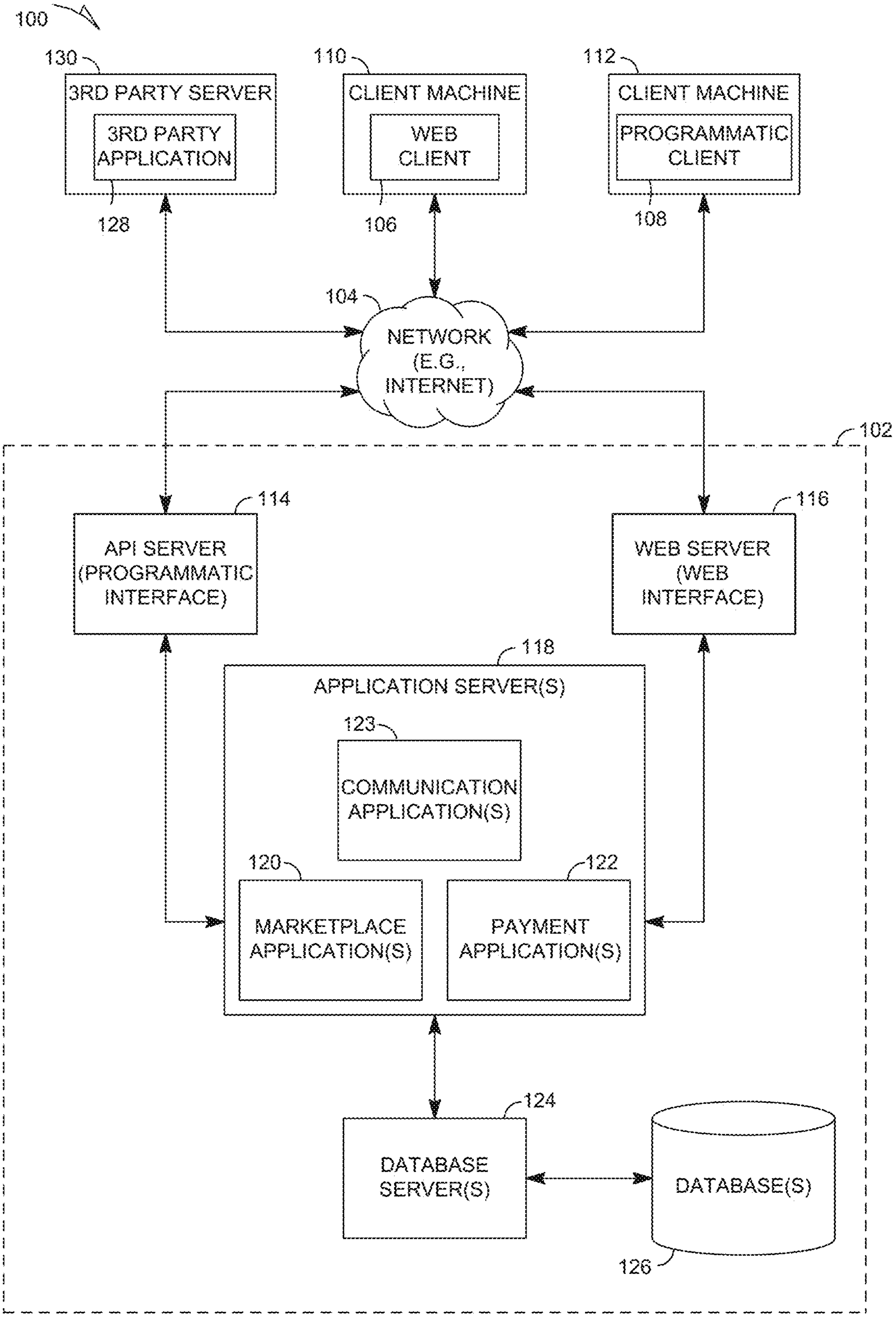
FIG. 1 is a network diagram depicting a client-server system, within which one example embodiment may be deployed.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Example methods and systems to communicate with users via text messages are described. In the following description, for purposes of explanation, numerous specific details are set forth in order to provide a thorough understanding of example embodiments. It will be evident, however, to one skilled in the art that the present invention may be practiced without these specific details.

An online marketplace is a website or mobile application where a user may buy or sell items from a provider of the online marketplace or other users of the online marketplace. The items are described in a published listing. The listing may indicate various properties or characteristics of the good, service, or proposed transaction such as brand, make, model, year, category, price (e.g., a current high bid, reserve price, or buy it now price), color, size, condition, sale type (e.g., auction or buy it now), seller, shipping availability and details, location, keywords, categories, or identifiers (e.g., UPC or ISBN code). The online marketplace may catalogue items for sale to group listing describing similar items together. The catalogue may provide a single, standard description of fungible items and include at least a portion of the various properties or characteristics.

In some instances, the online marketplace is associated with a real-world marketplace such as a bricks and mortar store or a chain of bricks and mortar stores. The real-world marketplace may have the same inventory, overlapping inventory, or different inventory than its associated online marketplace. The real-world marketplace may have a website that allows users to view inventory or interact with the real-world marketplace.

In some instances, the online marketplace or the real-world marketplace may communicate to its users various alerts, e.g., items for sale, discounts or other offers, events, or the like marketing notifications. The communication may occur via text or multimedia messages (e.g., short message service (SMS) or multimedia messaging service (MMS), collectively referred simply as "text messages") sent or received using the phone (e.g., feature phone or smartphone) of the user. In some instances, the user ("subscriber") may sign up with the marketplace to receive text messages from the marketplace. The text messages may be sent on a regular basis or on a scheduled basis. In some embodiments, the user may provide various constraints on the text message communications. Moreover, the marketplace can inhibit sending text messages to a user unless the user has subscribed and provided written authorization to receive text messages.

In some embodiments, the text messaging program opt-in process (also referenced herein as "subscription process") incentivizes and facilitates new subscribers to invite others to join the program. For example, a first user may subscribe to receive text message offers or alerts. Alerts can include notifications related to special offers, sales discounts, product listings, events, and the like marketplace notifications. The first user may receive an invitation to subscribe based on the first user's purchase or browsing history. The first user may subscribe for the alerts using, for example, a point of service (POS) system in a bricks and mortar store, a website, or by text messaging keywords to a short-code text number.

Accordingly, the first user, now a subscriber, may receive text message alerts from their favorite marketplaces that they might have otherwise missed. Subscribers who are pleased with the text message alert subscription may have contacts who would likewise be interested in receiving text message alerts. In one aspect, the text messaging system can help facilitate user referrals. Accordingly, in one embodiment, in response to the first user subscribing for text message alerts, the system can send a referral text to the first user during the subscribing process. The referral text message can be easily forwarded to one or more of the first user's contacts. For each referral who then subscribes, the first user (e.g., the "referrer") may receive a reward, for example, such as a discount, credit, and the like incentives. In this way, one subscriber may refer one or more contacts, and those contacts may each refer one or more contacts. Accordingly, such network effects can improve the program's coverage.

In another aspect of the text message alert system, a program can generate targeted text message alerts based on the browser activities of the subscribers in order to improve the users' experience. For example, a subscriber can receive text message alerts that are tailored to the interests of the subscriber. For example, the program may monitor the activities (referred to as "browsing activities" or "online activities" herein) of the subscriber on certain websites and, based on the subscriber's interactions with objects of the website, match particular alerts related to the subscriber's behaviors. Accordingly, the subscriber may receive more alerts that interest the subscriber and less unrelated alerts, thereby increasing the usefulness of the program to the subscriber. Furthermore, targeted text messages may increase the subscriber's satisfaction with the program, and thus may result in the subscriber referring the program to a contact. As such, in some embodiments, the referral process and the retargeting process may work in conjunction.

FIG. 1 is a network diagram depicting a client-server system 100, within which one example embodiment may be deployed. A networked system 102, in the example forms a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines/devices 110 and 112.

An Application Program Interface (API) server 114 and a web server 116 are coupled to, and provide programmatic and web interfaces respectively to, one or more application servers 118. The application servers 118 host one or more marketplace applications 120, payment applications 122, and communication applications 123. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for items that are made available via the marketplace applications 120. The communication applications 123 may likewise provide a number of communication services and functions to users. In one embodiment, the communication applications 123 may provide the marketplace applications 120 and payment applications 122 various text messaging services, such as SMS/MMS communication services. For example, the marketplace applications 120 and payment applications 122 may communicate recipient and content information to the communication applications 123, and in response, the communication applications 123 can transmit text messages based on recipient and content information in accordance with SMS, MMS, or the like communication protocols. Additionally, the communication applications 123 may receive text messages based on SMS, MMS, and/or the like protocols and may communicate recipient and content information to the marketplace applications 120 and payment applications 122. Accordingly, the marketplace applications 120 and payment applications 122 may transmit and receive text messages with users. While the marketplace, payment, and communication applications 120, 122, 123 are shown in FIG. 1 as all forming part of the networked system 102, it will be appreciated that, in alternative embodiments, each of the marketplace, payment, and communication applications 120, 122, 123 may form part of respective marketplace, payment, and/or communication services that are separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace, payment, and communications applications 120, 122, 123 could also be implemented as standalone software programs, which do not necessarily have networking capabilities.

In addition, while the various marketplace, payment, and communications applications 120, 122, 123 have been described above as having separate functionalities, in alternative embodiments these functionalities may be performed by any one or more of the various marketplace, payment, and communications applications 120, 122, 123.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
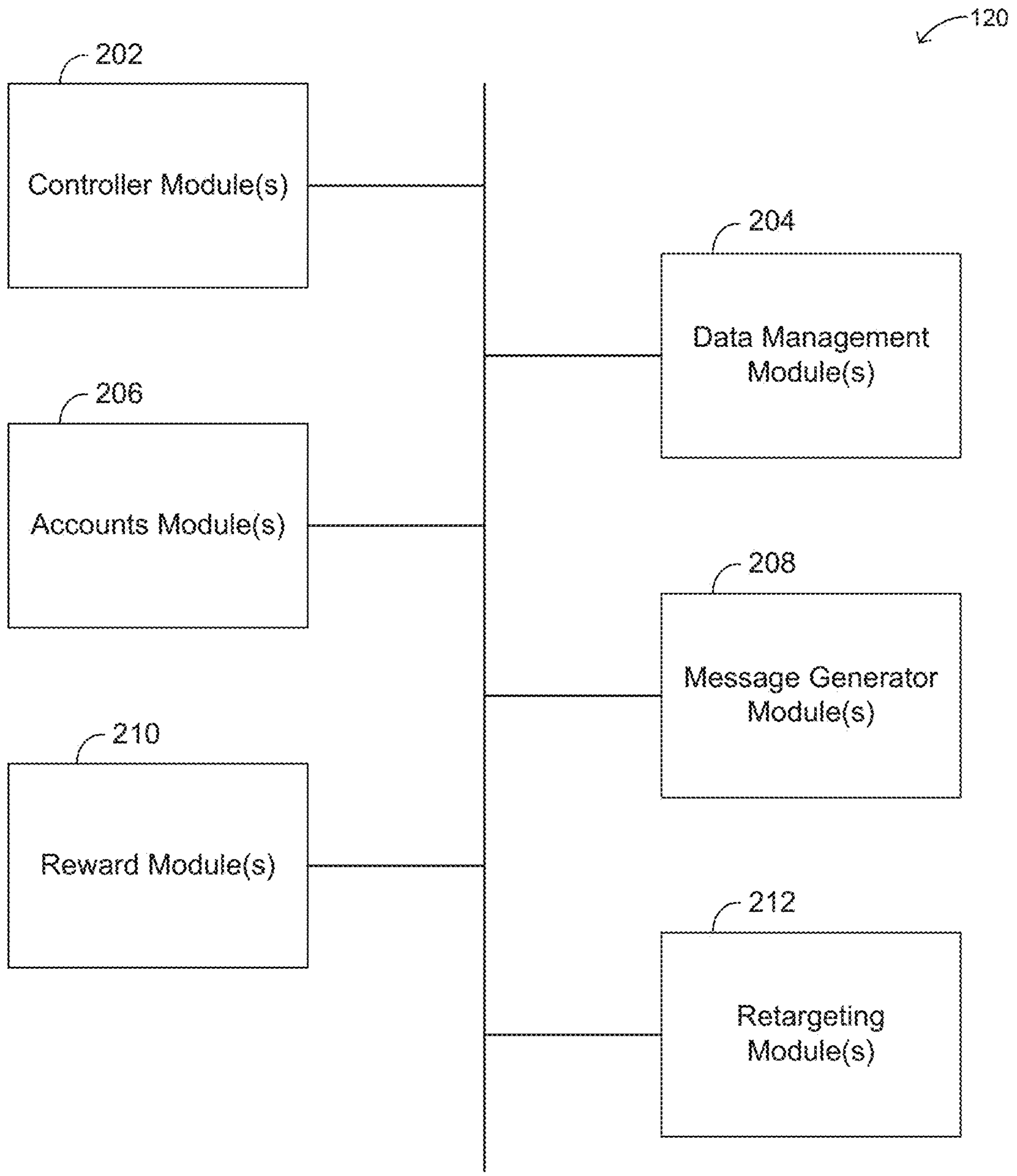
FIG. 2 is a block diagram illustrating an example embodiment of multiple modules forming at least a portion of the marketplace and payment applications and, which are provided as part of the client-server system.

FIG. 2 is a block diagram illustrating an example embodiment of multiple modules 202-212 forming at least a portion of the marketplace and payment applications 120 and 122 (or simply referred to as "marketplace application 120"), which are provided as part of the client-server system 100. The modules 202-212 of the illustrated marketplace application 120 include a controller module(s) 202, a data management module(s) 204, an accounts module(s) 206, a message generator module(s) 208, an reward module(s) 210, and a retargeting module 212.

The modules 202-212 of the marketplace application 120 may be hosted on dedicated or shared server machines (not shown) that are communicatively coupled to enable communications between server machines. Each of the modules 202-212 are communicatively coupled (e.g., via appropriate interfaces) to each other and to various data sources, so as to allow information to be passed between the modules 202-212 of the marketplace application 120 or so as to allow the modules 202-212 to share and access common data. The various modules of the marketplace application 120 may furthermore access one or more databases 134 via the database servers 132.

The marketplace application 120 may provide a number of offers, sales, discounts, listings, and/or pricing notifications whereby a seller may list (or publish information concerning) items for sale, a buyer can express interest in or indicate a desire to purchase such items, and a price can be set for a transaction pertaining to the items. In particular, users can subscribe to receive text message alert of product offers, sales, discounts, listings, and/or pricing. In some example embodiments, the marketplace application 120 can be configured to reward a user (e.g., a user who has subscribed to receive text message alerts) for referring other users to subscribe to receive text message alerts. For example, the market place application 120 may receive a first communication indicative that a first user has subscribed to receive text message alerts. Subsequently, the marketplace application 120 may receive a second communication indicative that a second user has subscribed to receive text message alerts and that the second user was referred by the first user to subscribe to receive text message alerts. In response to receiving the second communication, the marketplace application 120 can provide the first user a reward in the form of a discount or credit, for example.

To this end, the marketplace application 120 is shown to include the controller module 202 and the data management module 204 operatively coupled to the accounts module 206, the message generator 208, the reward module 210, and the retargeting module 212, which together with the communication applications 123 of FIG. 1 can serve to provide text message alerts. The controller module 202 can be configured to control the operation of the various modules 204-212 as well as the flow of information, data, and/or signals between the modules 202-212. In turn, the data management module 204 can be configured to facilitate the flow of the information, data, and/or signals between the modules 202-212, in accordance with the controller module 202. In addition, the data management module 204 can be configured to support communication between the marketplace application 120 and the network 104, the payment and communication applications 122,123, and/or the database server 124 of FIG. 1.

The accounts module 206 can be configured to maintain user account data, including adding and storing new user accounts for users who request to receive text message alerts, as well as storing data related to referral rewards. For example, in one embodiment a user can provide a seller of the marketplace application 120 user account information (also referred to as "user account data") for subscribing to receive text message notifications. The accounts module 206 can receive the user account information from the data management module 204.

The user account information can include, among other information, data indicating that there was written authorization from the user for the seller to provide text message alerts for offers, sales, discounts, listings, pricing, and/or other notifications. In some embodiments, the marketplace application 120 will not send text messages to a user unless that user has provided written authorization. Written authorization can include the user entering a phone number into an electronic device in a manner that indicates the user's express authorization. It will be appreciated that authorization can be expressed in any suitable manner, such as clicking a check box associated with providing authorization, or, in other embodiments, providing verbal authorization, in accordance with local laws and policies.

Furthermore, the accounts module 206 can perform various authentication and verification processes to determine legitimate subscribers and to safe guard privacy. In this way, the marketplace application 120 can avoid providing text messages in a way that may aggravate potential customers and can, instead, provide a positive user experience.

In response to receiving user account information, the accounts module 206 can add or store a user account to a database of subscribers. Each user account of the database of subscribers can correspond to a user who has subscribed to receive at least some type of notification. User accounts can be active or inactive. An active user account is an account in which the marketplace application 120 can send text message alerts to the corresponding user. An inactive user account is an account in which the user account includes data of the user but the marketplace application 120 will not send text message notifications to the corresponding user. For example, the accounts module 206 can be configured to set as inactive accounts without authorization. Additionally, the accounts module 206 can be configured to set an account as inactive if a time period lapses (e.g., if the user has subscribed to receive text message alerts for a set amount of time) of or text message alert limit can become inactive (e.g., if the user has subscribed to receive text message alerts for a set number of alerts).

In some embodiments, the types of offers, sales, discounts, listings, and/or pricing of the notifications can be determined based on data stored in the respective user account. For example, the particular notifications can be determined (e.g., targeted) based on past user purchase history, purchased products, purchase times, purchase values, shipping destination, location, and other like considerations indicative of user preferences or interests. In one aspect, among others, targeted alerts can increase the likelihood that the user will make a purchase. In addition, targeted alerts can help create a positive user experience and thus increase the number of people whom the user may refer.

As stated, it can be beneficial to the seller if users refer other users. The user may know and refer people who might be interested in some aspects of the seller's business. As such, the referral itself may be targeted, and these referrals may be comparatively more likely to subscribe and to purchase the items of the seller. Additionally, in turn, those referred users may refer additional users, and so on, leading to increased exposure of the seller's business. Accordingly, in one aspect, the marketplace application 120 can provide systems and processes to incentivize referrals.

For example, the accounts module 206 can facilitate providing rewards, such as, but not limited to, offers, sales, discounts, credit, and/or like incentives when a user subscribes based at least on a referral by another user. In this case, the marketplace application 120 can provide the referring user ("the referrer") a reward, such as, but is not limited to, credit, discounts, and/or the like incentives. The referrer can receive rewards for each of one or more referrals who subsequently subscribe. The referrer may additionally or alternatively receive rewards for purchases made by users that were referred by the referrer. In some embodiments, for each seller there may be a limit on the maximum aggregate reward given based on referrals. Additionally or alternatively, there may be a limit on the reward given for each of one or more types of events, such as, but not limited to, referrals, purchases, and the like activities. Determining rewards will be described in greater detail later in connection with FIGS. 5 and 9.

To facilitate rewards for encouraging referrals, user account information, for instance, can include an indication that the subscribing user was referred by an existing user or subscriber, if any. As one example, the corresponding user account information can include a data field related to an identifier of the referrer. The identifier can be a phone number, a name, a unique code, or any suitable identifying information. The identifier can be used to match a user account of the account database in order to identify the referrer. In response to matching a user account to the identifier, a reward for the referrer can be determined based on the matching user account information of the user account. One example of a data structure of a user account will be described in greater detail later in connection with FIG. 4.

The message generator module 208 can provide functionality to generate various text message alerts. In one aspect, the text messages can be dynamically generated or published based on information from the sellers (e.g., based on the products) and the subscribers (e.g., based on personal data). Accordingly, the message generator module 208 can be configured to generate one or more text messages based on the activities of the users related to subscribing, referrals, and the like activities.

For example, in response to receiving user data related to a first user subscribing to receive text message alerts, the message generator module 208 can generate a first text message. The first text message ("referral text message") can include an offer to subscribe to receive alerts via text messages. But instead of sending the referral text message directly to an unsubscribed user, the message generator 298 can generate the referral text message for transmitting to the first user for forwarding to a second user, such as a contact stored in the phone of the first user. In one embodiment, the message generator 208 can be configured to utilize the data management module 204 and/or the communication application 123 of FIG. 1 for transmitting the referral text message to the first user. The referral text message can be phrased in a way that the referral text message appears to be have written by the first user.

In this way, the first user can refer the second user to receive text message alerts by forwarding the referral text message. By sending the referral text message to the first user (e.g., a subscriber), the marketplace application 120 does not send referral text messages to users who have not previously provided authorization. If the first user forwards the referral text message to the second user, the second user will be provided information for subscribing via the referral text message. Furthermore, if the second user subsequently subscribes, then the marketplace application 120 can provide the first user a reward for being a referrer, as will be described in greater detail below.

Additionally or alternatively, the message generator module 208 can be configured to determine and/or generate a hyperlink and to include the hyperlink in the referral text message. The hyperlink can be associated to a web resource, such as a web page, for signing up to subscribe to receive text message alerts. For example, the web resource can be configured to communicate user data to the accounts module, and the accounts module 206 can be configured to add accounts to and/or modify accounts of the database of accounts based on the user data. In this way, the first user (e.g., in this case, acting as a referrer) can forward the referral text message to the second user to refer the second user to subscribe to receive text message alerts. When the second user receives the referral text message, the second user can activate the hyperlink in order to receive the web resource for signing up to subscribe to receive text message alerts.

In some embodiments, the hyperlink can be configured to provide the web resource an indicator of a referrer, such as the first user who has forwarded the referral text to a second user. For example, the hyperlink may automatically provide the webpage identification data that identifies the first user. In this way, the second user need not manually enter data related to the referrer. Aspects of the referral text message will be described in greater detail later in connection with FIGS. 5 and 8.

Additionally or alternatively, the message generator module 208 can be configured to generate a second text message ("acknowledgment text message") in response to a requested to subscribe. The acknowledgment text message can include an acknowledgement that a user account has been created or added for the subscribing user. The data management module 204 and/or communication application 123 of FIG. 1 can be configured to transmit the acknowledgment text message to the user who is subscribing. Aspects of the acknowledgement text message will be described in greater detail later in connection with FIG. 5.

Additionally or alternatively, the message generator module 208 can be configured to generate a third text message ("reward text message") that can serve to notify a referrer (e.g., corresponding to the first user if the first user forwarded the referral text message to the second user) that a reward has been credited to the referrer. In an embodiment, the message generator 208 can be configured to generate the reward text message in response to a user (e.g., the second user) subscribing and providing an indication of the referrer to indicate that the referrer referred the subscribing user. The data management module 204 and/or communication application 123 of FIG. 1 can transmit the reward text message to the associated referrer. Aspects of the reward will be described in greater detail below and later in connection with FIGS. 5 and 9.

The reward module 210 can be configured to determine a reward to provide the first user if the second user subscribes to receive text message alerts based on a referral (such as, a referral text message) from the first user. For example, in response to the accounts module 206 receiving the second user data to subscribe the second user, the reward module 210 can access the first user account and can determine a reward based on the first user data of the first user account. The reward module 210 can update the reward data of the first user account based at least on the determined reward. For example, the reward module 210 can increment the reward data based on the amount of the reward. The reward data can serve as a way to track the rewards given to the users in order to implement limits on the rewards that a user can receive.

In one embodiment, the reward module 210 can be configured to determine whether the second user account was added based at least on receiving the second user data. For example, the reward module 210 can determine that the second user has a pre-existing account and thus is not a new user. In this case, the reward module 210 can be configured to provide no reward to the first user. In the case that the second user did not have a previous user account, the reward module 210 can be configured to provide the first user a reward. Accordingly, the reward module 210 can be configured to provide the first user a reward based at least on a determination that the second user account was added based at least on the second user data.

The retargeting module 212 can serve to provide retargeting features. Retargeting can include activities associated with providing targeted advertisements, such as text message alerts, based on online activities of users. For example, retargeting can include monitoring a user's browsers activities, analyzing the browser activities, selecting an alert based on the analysis, and generating a text message alert based on the selected alert. Accordingly, the retargeting module 212 can be configured to provide real-time data collection, retargeting logic, dynamically publication of text message alerts, and an interface with the communication application 132 for transmitting text messages alerts to one or more the user devices. The retargeting module 212 will be described in greater detail later in connection with FIG. 11.

Example User Interface

Figure 3:
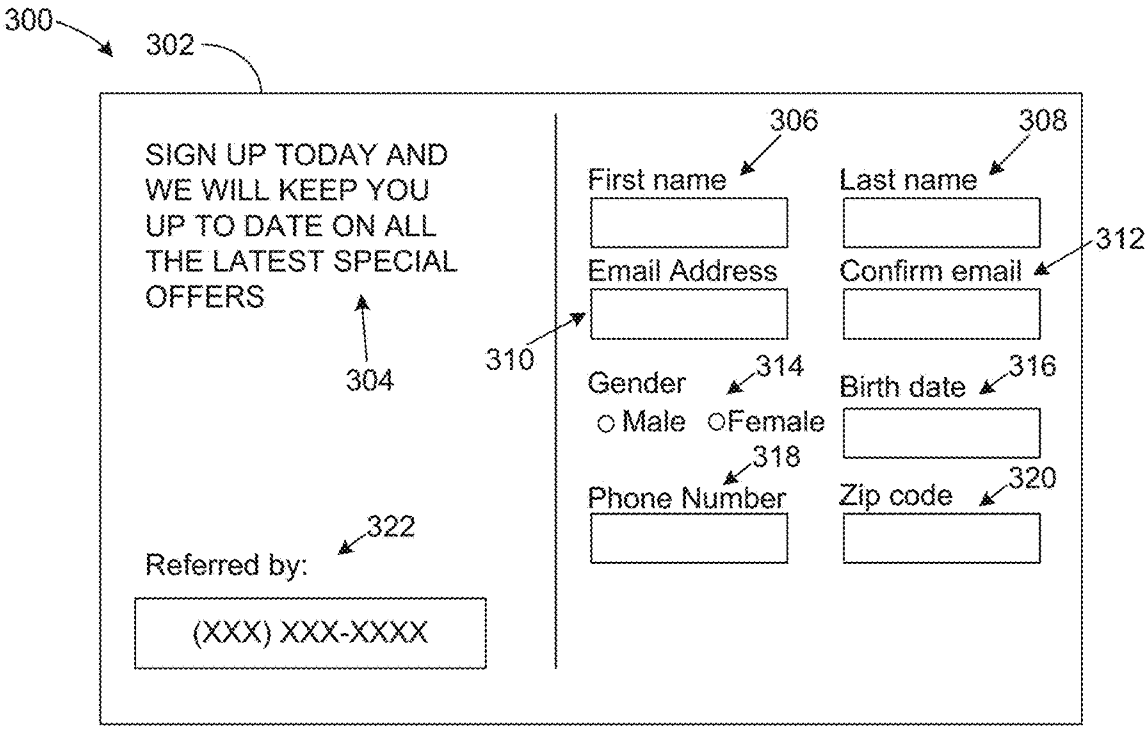
FIG. 3 is an interface diagram illustrating an example user interface with multiple display elements delivered to a client device, according to an example embodiment.

FIG. 3 is an interface diagram illustrating an example user interface 300 with multiple display elements delivered to a client device 110, according to an example embodiment. As illustrated in FIG. 3, the user interface 300 may be presented to a user on the display of a client device (e.g., client device 110). In this example, the user interface 300 corresponds to a graphical user interface of a web resource, such as a webpage, for the opt-in (subscribing) process to receive text message alert notifications from the network-based marketplace 102. A user may opt in using a computing device such as a desktop computer, laptop computer, or mobile computing device connected to the network 102. In some embodiments, the user may opt in for the text message alert notifications using a point of service system at a bricks and mortar store. For example, a cashier may perform at least a portion of the opt-in process for the user in order to reduce the workload of the user.

Consistent with this embodiment, upon initiation of a network communication session between the client device 106 and network-based marketplace 102, the controller module 202 may determine that a user is requesting to opt-in to receive text message alert notifications. The opt-in process can be initiated by a user whether or not that user was referred by another second user. As illustrated in FIG. 3, the user interface 300 includes a frame 302 that contains one or more interface elements for inputting user data that can be used to generate a new user account. The frame 302 includes introductory text 304, a first name input 306, a last name input 308, an email address input 310, an email confirmation input 312, a gender input 314, a date of birth input 316, a phone number input 318, and a zip code input 320. In some embodiments of the user interface 300, the frame 302 can also include a referral input 322 for receiving identification to a user, if any, who has referred the present subscriber. The inputs 306-322 can include respective text boxes and accompanying text prompting the user to enter the appropriate data. The data entered into the inputs 306 to 322 can be transmitted to the accounts module 206 for creating and storing a corresponding user account.

It will be understood by a person of ordinary skill that other embodiments of the user interface 300 need not include each element of FIG. 3 and other embodiments may include more or less elements. In one aspect, the number of elements displayed by the user interface 300 may be determined based on the device displaying the user interface 300.

For example, a mobile device having limited display space and data bandwidth may include less elements than, for example, a desktop computing device. As another example, a terminal at a point of service device may include more elements than those shown in FIG. 3, and the cashier, for instance, can populate one or more of the inputs of the user interface 300. The cashier may obtain the information to populate the inputs based on scanning a payment device such as a credit card. In a particular embodiment the user interface 300 includes the phone number input 318 and the introductory text 304 but not the remaining elements of FIG. 3. Such a user interface can be advantageous for devices operating with limited resources.

Example Data Structure

Figure 4:
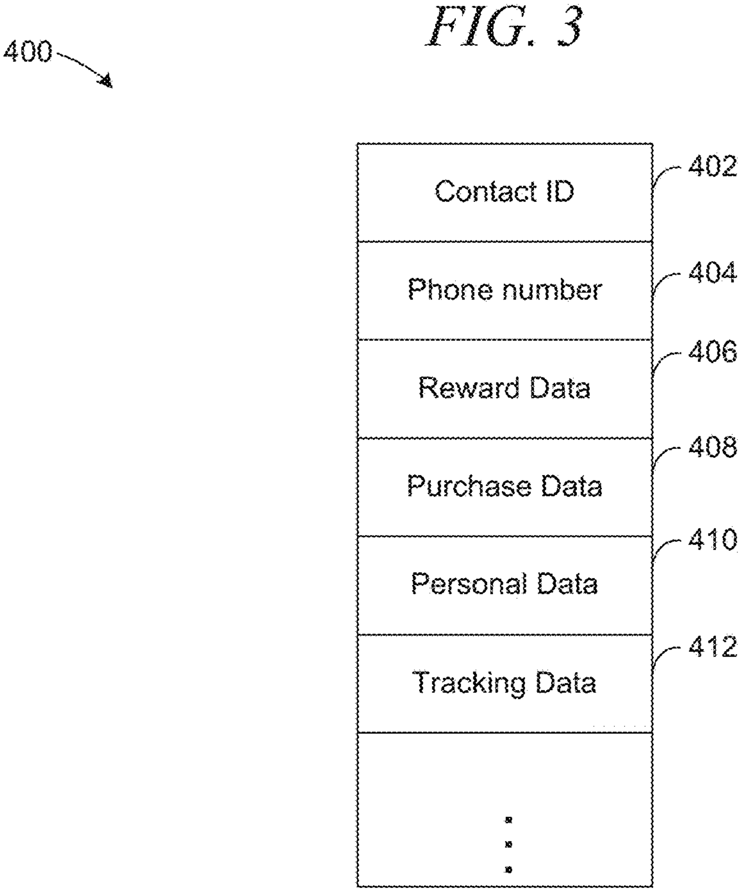
FIG. 4 is a block diagram illustrating an example data structure of a user account with multiple data fields stored in a database communicatively coupled to the network-based marketplace.

FIG. 4 is a block diagram illustrating an example data structure 400 of a user account with multiple data fields. The data structure 400 may be stored in a database 126 communicatively coupled to the network-based marketplace 102. The data structure 400 may be created and/or accessed by the accounts module 206 in response to receiving user data (e.g., for opting in), adding a user account, determining a reward, determining text message alerts, tracking, and the like activities of the marketplace application 120. For example, user data can be inputted by a user via the user interface 300 in order to opt in or subscribe to receiving text message notifications of product alerts. The user interface 300 can transmit the user input to the marketplace and payment applications 120, 122. Accordingly, the data structure 400 can be created by the accounts module 206 in response to receiving the user data with the data management module 204.

The illustrated data structure 400 of FIG. 4 includes a contact ID data field 402, a phone number data field 404, a reward data field 406, a purchase data field 408, a personal data field 410, a tracking data field 412, and the like data related to a user account. The contact ID 402 can correspond to data identifying a user. The phone number data field 404 can correspond to a phone number to which text message may be sent. The reward data field 406 can correspond to data related to past rewards. For example, the reward data field 406 can store one or more reward totals that have been provided to the user. The reward data field 406 can include data tracking redeemed rewards and or pending rewards (e.g., unused rewards). The purchase data field 408 can correspond to data tracking the corresponding users purchase history, including information related to past purchases, past purchase amounts, past purchase values, shipping addresses, purchase frequencies, and the like activities. The personal data field 410 can correspond to data related to the associated user's location, social network, employment status, and the like information. The tracking data field 412 can correspond to data, in addition to the data provided in data fields 402-410, related to tracking activities of the user. Tracking data can be used to support retargeting services (as described in greater detail below in connection with FIGS. 10-15). To protect private, sensitive user data, such information is either not collected or is protected by data security technology.

Example Subscription and Referral Processes

Figure 5:
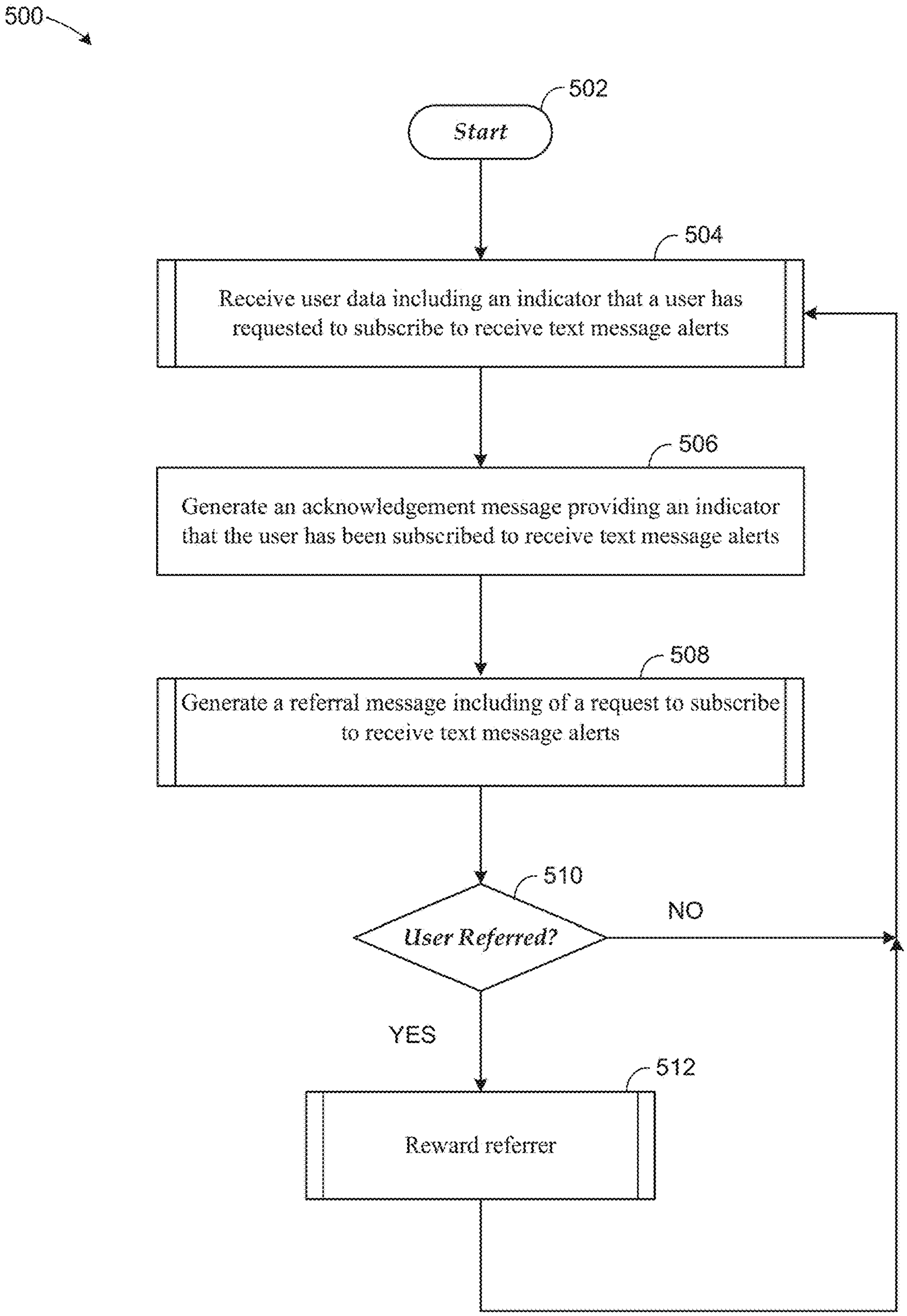
FIG. 5 is a flowchart illustrating an example method of an example opt-in process.

FIG. 5 is a flowchart illustrating an example method 500 of an example opt-in process. In this example, the method 500 may include operations such as receiving user data 504, generating an acknowledgment message 506, generating a referral message 508, testing whether the user was referred 510, and rewarding the referrer 512. The example method 500 will be described, by way of explanation, below as being performed by certain modules. It will be appreciate, however, that the operations of the example method 500 can be performed in any suitable order by any number of the modules shown in FIG. 2.

At operation 502, the method 500 starts at block 502 and proceeds to block 504 for receiving user data including an indicator that a user has requested to subscribe to receive text message alerts. The user data may include a telephone number of the user. In some embodiments the telephone number corresponds to the indicator that the user has requested to subscribe to receive alerts via text messages. In some embodiments, the user data can be received by the accounts module 206 by using the data management module 204. The user data can be provided by the user via the user interface, such as the interface 300 of FIG. 3. In addition to the telephone number, the user data can include one or more of the data fields 402-410. In response to receiving the user data, the accounts module 206 can be configured to create a user account associated with the user. For example, the user account can be stored in the database 126 of FIG. 1. A subroutine of block 504 will be described in greater detail later in connection with FIG. 7.

In response to receiving the user data, the method 500 can proceed from block 504 to block 506 for generating an acknowledgment message. The acknowledgment message can provide an indicator to the user that the user has been subscribe to receive alerts via text messages. Additionally or alternatively, the acknowledgment message can include instructions for the user to request help and/or to cancel the opt-in process. For example, the acknowledgement message can include the text such as, "Reply HELP for help" and/or "Reply STOP to cancel." Accordingly, if the user replies with a text message containing the keyword "HELP," the controller module 202 can send the user additional text messages that provide further explanation of the opt-in process or the subscription service. Additionally, if the user replies with a text message containing the keyword "STOP," the controller module 202 can terminate the opt-in process.

The acknowledgment message may also include text that explains that the user will receive the referral text, and that referral text can be forwarded to a friend or other contact in order to receive a reward or special offer. In one embodiment, the message generator module 208 generates the acknowledgment text message, and the data management module 204 and/or the communication application 123 can transmit the acknowledgment text message to the user at the phone number provided in the user data and/or stored in the associated user account.

Also, in response to receiving the user data, the method 500 can carry out block 508 for generating a referral message for setting to the user that has initiated the method 500 for opting in. The referral message can include a request or invitation to subscribe to receive text message alerts, and the request or invitation will be sent to the user, the person who has subscribed. However, the referral text message is configured to be forwarded to a contact (e.g., a second user) of the user (e.g., a first user).

The referral text message can be generated in a style that gives it an appearance that the first user has written the text message for the contact of the first user. As a result, the contact of the first user may be less likely to disregard the text message if the first user forwards the referral text message to the contact. In one embodiment, the message generator module 208 generates the referral text message, and the data management module 204 and/or communication application 123 transmits the referral text message to the user at the phone number provided in the user data and/or stored in the associated user account. A subroutine of block 508 will be described in greater detail later in connection with FIG. 8.

At block 510, the method 500 can test whether the user was referred by a previous user. For example, a previous user may have forwarded a referral text message to the first user who currently opting. In one embodiment, the controller module 202 can signal to the accounts module 206 to test the user data and/or the user account to determine whether or not there is indication that the user was referred by a referrer. For example, the data structure 400 of FIG. 4 can include a data field (not shown) that provides an identity of the referrer. The identity of the referrer can be indicated by a contact ID or a telephone number, as two non-limiting examples. Other suitable identification information can be used.

If the user was not referred by another user, the opt-in process for the current user is complete and the method 500 can return to block 504 for another user requesting to opt in to receive alerts via text messages.

If the user was referred by another user, the method 500 proceeds to block 512 for rewarding the referrer. For example, the referrer may receive a special offer or reward, such as a discount and/or credit. In one embodiment, the reward module 210 can be configured to determine the reward. In one embodiment, reward module 210 can determine the reward based on data associated with one or more of past rewards to the referrer or other data stored in the referrer's user account. A subroutine of block 512 will be described in greater detail later in connection with FIG. 9.

Figure 6:
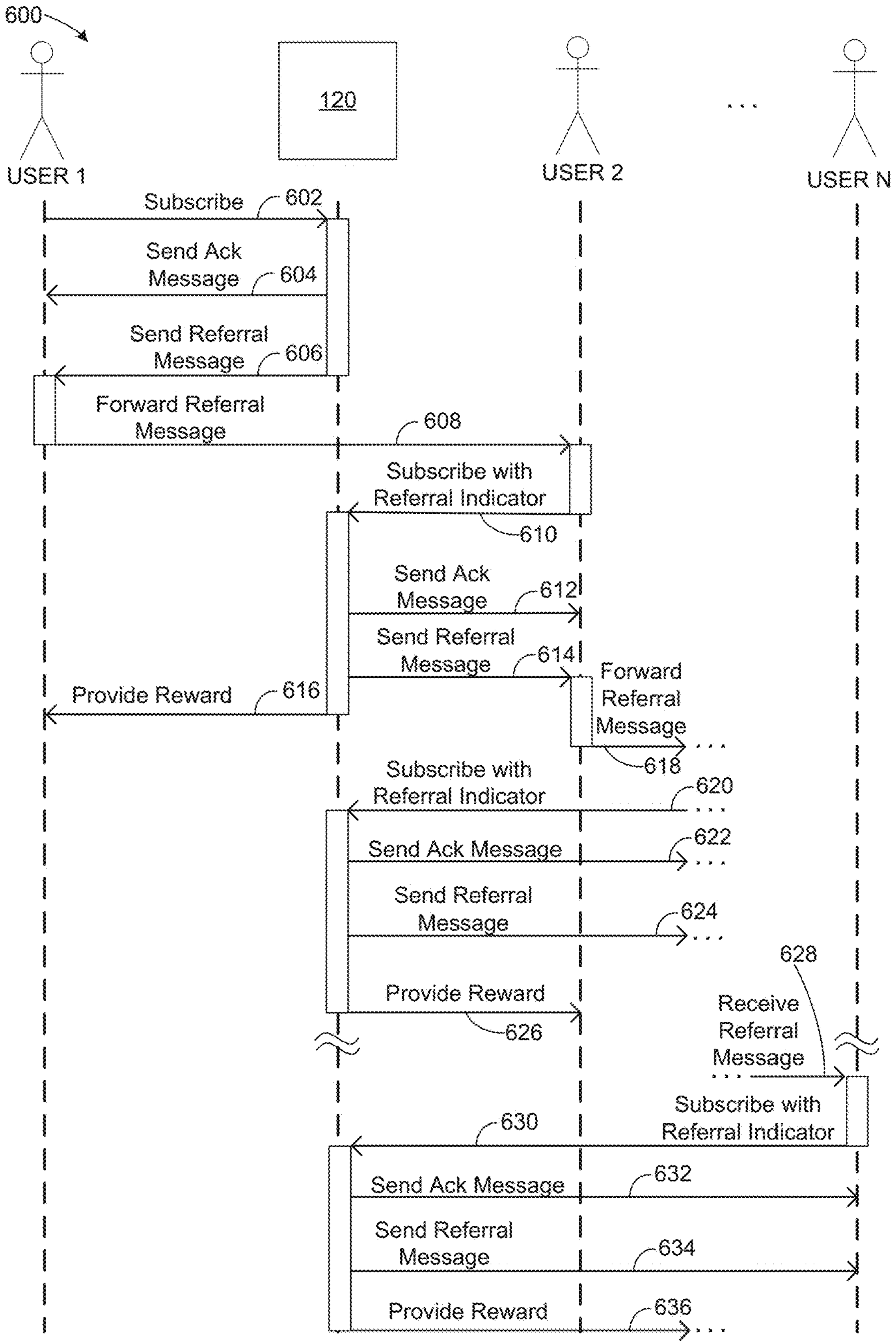
FIG. 6 is an interaction diagram illustrating an example use case of multiple users opting in to receive text message alerts based on a referral system.

FIG. 6 is an interaction diagram illustrating an example use case 600 of multiple users opting in to receive text message alerts based on a referral system. In particular, FIG. 6 illustrates interactions between various components of the network system 100, according to an example embodiment. Specifically, FIG. 6 illustrates interactions of N users (corresponding, e.g., to N client devices 106) and the marketplace application 120 of FIG. 1.

At operation 602, User 1 initiations the process to subscribe to receive text message alerts from the marketplace application 120. In some embodiments, the accounts module 206 receives the user data from User 1 via communications over the network 104 and by using the communication application 123. The User 1 can initiate the process to subscribe at a point of service terminal or by providing the corresponding data by inputting the data with webpage.

At operation 604, the marketplace application 120 receives the user data and creates a corresponding user account, for example in accordance with block 504 FIG. 5. The marketplace application 120 can in turn send an acknowledgment message to User 1, in accordance with block 506. As stated in connection with FIG. 5, the acknowledgment message can include text indicating to User 1 that User 1 is subscribed to receive alerts via text messages.

At operation 606, the marketplace application 120 can send User 1 a referral message. The referral message can correspond to a text message that includes a request to subscribe to receive text message alerts. In one embodiment, the marketplace application 120 can perform the operation 606 in accordance with block 508 of FIG. 5.

At operation 608, User 1 can forward, in response to receiving the referral message, the referral message to a User 2. The User 2 can be a contact stored in a mobile device of User 1. For example, the mobile device can correspond to the device that receives the acknowledgment and referral messages of operation 604 and 606. The User 1 can be incentivized the forward the referral message based on the possibility of receiving a reward from the marketplace application 120.

At operation 610, User 2, in response to receiving the referral message from User 1, initiates a process to subscribe to receive alerts via text messages from the marketplace application 120. For example, User 2 can provide the marketplace application 120 with user data associated with User 2. The user data of User 2 can be inputted via the any of the various interfaces discussed in connection with operation 602, block 504 of FIG. 5, and the user interface 300 of FIG. 3. For example, the referral message forwarded to User 2 at operation 608 may include a hyperlink to the user interface 300. Moreover, the hyperlink can be configured to automatically populate the referral input 322 with the telephone number associated with User 1. In addition, the user data of User 2 can include an indication that the user has provided written authorization for the marketplace application 120 to send User 2 text messages.

At operations 612 and 614, the marketplace application 120, in response to receiving the user data of User 2, creates a user account associated with User 2 and sends the acknowledgment and referral text messages to User 2 in a manner similar to operations 604 and 606, as described above.

At operation 616, the marketplace application 120 provides User 1 a reward for referring User 2 and because User 2 subscribed to receive text message alerts. For example, the reward module 210 and the accounts module 206 of the marketplace application 120 can determine the reward based on accessing the user account associated with User 1. The reward can be selected based on the data of the user account in order to increase the likelihood that User 1 will purchase a product or service the marketplace application 120, and in order to increase the likelihood that User 1 is incentivized to continue to receive text message alerts and to make additional referrals.

At operation 618, User 2 can forward the referral message sent at operation 614 to another user, in a similar manner as was described above in connection with operation 608. In response to receiving the forwarded referral message of operation 618, one or more users may subscribe to receive alerts via text messages at operation 620. Accordingly, the marketplace application 120 can send a number of acknowledgement and referral messages at operations 622 and 624 and provide User 2 with a reward at operation 626.

The referral process can be repeated for a number of users. For example, User N receives a referral message at operation 628 and subscribes at operation 630 with an indicator of a referrer. In response, the marketplace application 120 transmits acknowledgment and referral messages at operation 632 and 634 to the user N and provides a reward to a corresponding user at operation 636.

Figure 7:
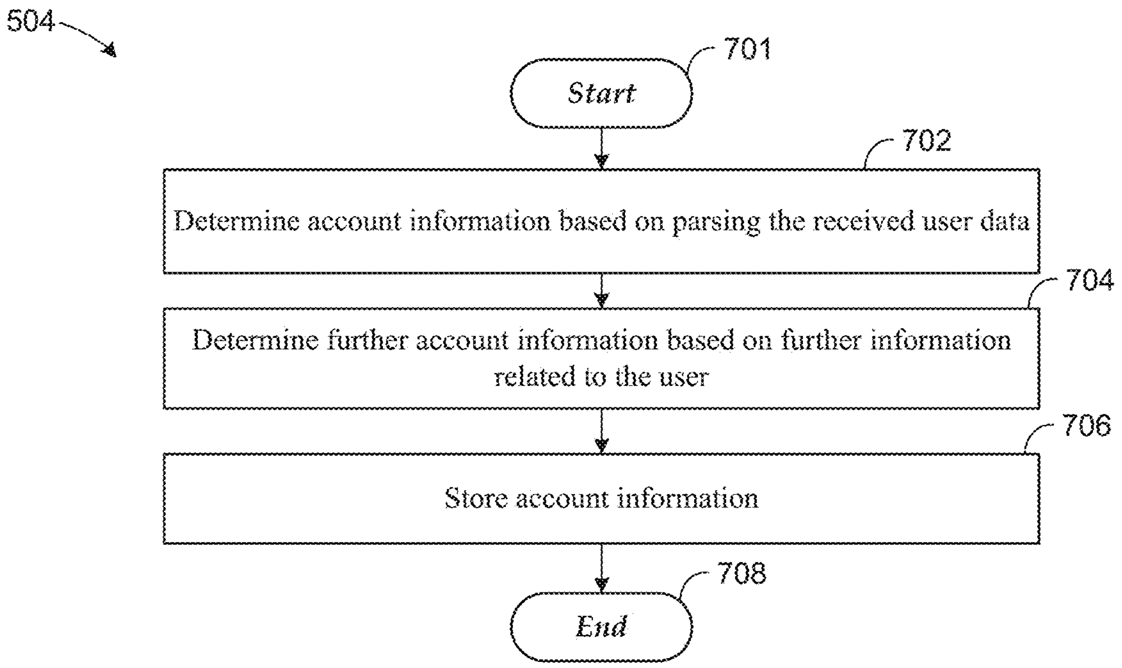
FIG. 7 is a flowchart illustrating an example method of an example process for receiving user data including an indicator that a user has requested to subscribe to receive text message alerts.

FIG. 7 is a flowchart illustrating an example method 504 of an example process for receiving user data including an indicator that a user has requested to subscribe to receive alerts via text messages. In this example, the method 504 may include operations such as determining account information 702, determining further account information 704, and storing account information 706. The example method 504 will be described, by way of explanation, below as being performed by certain modules. It will be appreciate, however, that the operations of the example method 504 can be performed in any suitable order by any number of the modules shown in FIG. 2.

The method 504 starts at block 701 and proceeds to block 702 for determining account information based on parsing the received user data. The user data can be provided by, for example, the user interface 300. The accounts module 206 can receive the user data from the communication application 123 and/or the data management module 204. The accounts module 206 can parse the received user data for one or more of a contact ID, a phone number, reward data, purchase data, or personal data and store the data parsed from the user data in a data structure 400 stored in the database 126.

In addition, the user data can include one or more parameters determining limitations on how the marketplace application 120 provides the alerts via text messages. One example parameter corresponds to a limit on the frequency of the text messages. For instance, the user can provide user data that restricts the marketplace application 120 from sending more than a specified amount text messages over a specified period of time (e.g., 5 text messages per month).

At block 704, the method 504 determines further account information based on information extraneous to the received user data. For example, the accounts module 206 can be configured to match the telephone number to a location. Location information can be useful for targeting alerts to the user such that the user is more likely to purchase products or services from the marketplace application 120. As another example, information parsed from the received user data may be used to search for a name of the user. Determining the user's name can be used for personalizing text messages to the user.

In response to determining account information at blocks 702 and 704, the method 504 moves to block 706 for storing the determined account information. For example, in one embodiment the accounts module 206 creates and stores user account information in one or more databases 126 of FIG. 1. Once the account information is determined and stored, the method 504 can end at block 708.

Figure 8:
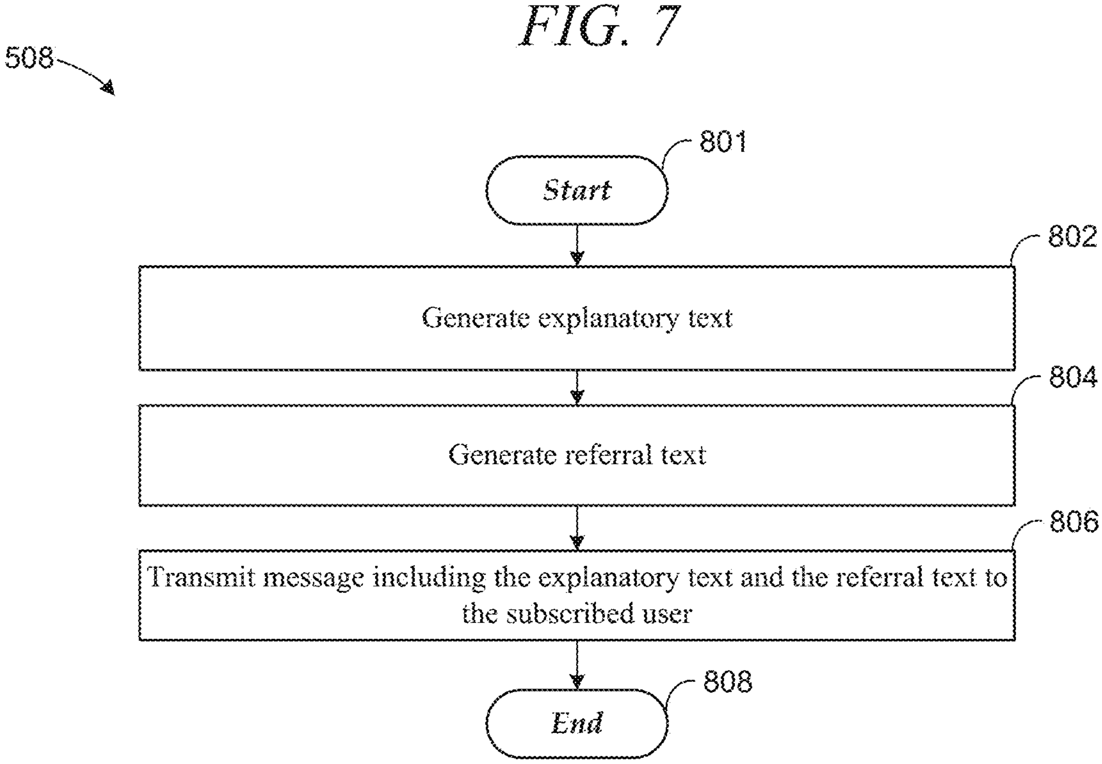
FIG. 8 is a flowchart illustrating an example method of an example process for generating a referral text message.

FIG. 8 is a flowchart illustrating an example method 508 of an example process for generating a referral text message. In this example, the method 508 may include operations such as generating explanatory text 802, generating referral text 804, and transmitting the message including the explanatory text and the referral text. The example method 508 will be described, by way of explanation, below as being performed by certain modules. It will be appreciate, however, that the operations of the example method 508 can be performed in any suitable order by any number of the modules shown in FIG. 2.

The method 508 can start at block 801 and proceeds to block 802 for generating explanatory text. In one embodiment, the message generator module 208 can be configured to generate the explanatory text to be included in the referral text message. As stated, the marketplace application 120 can transmit the referral text to the current subscriber. In response to receiving the referral text message, the subscriber can forward the referral text message to a contact, such as a friend, encouraging the contact to also subscribe. By generating the explanatory text, the marketplace application 120 can reduce the workload of the subscriber, thereby increasing the likelihood that the subscriber will refer a contact. Including the explanatory text may also increase the number of contacts to whom the subscriber will forward the referral message. Furthermore, the explanatory text can include text written in a style that gives the referral text message the appearance that the subscriber wrote the referral text message. For example, the explanatory text may include a message approximately as follows: "Hey, you should sign up for XYZ Co. Mobile Alerts to get special offers." Accordingly, the explanatory text can increases the likelihood that the referred contact will read the text and, more, accept the referral.

At block, the method 508 generates referral text. In one embodiment, the message generator module 208 can be configured to generate the referral text to be included in the referral text message. The referral text can include text, as well as hypertext or any suitable object configured to link to a webpage. For example, the referral text can include a unique hyperlink that is configured to load a webpage for subscribing and for passing data indicative of the referrer's referral. In this way, the referred contact need not enter in contact information of the subscriber. As result, the referral system can be more effective because participants are more likely to receive a referral reward and user satisfaction may increase.

At block 806, the method 508 can transmit the referral text message including the explanatory text and the referral text to the subscribed user. In one embodiment, the message generator module 208 can provide the communication application 123 of FIG. 1 the referral text message for transmission. Once the referral text message is sent, the method 508 can end at block 808.

Figure 9:
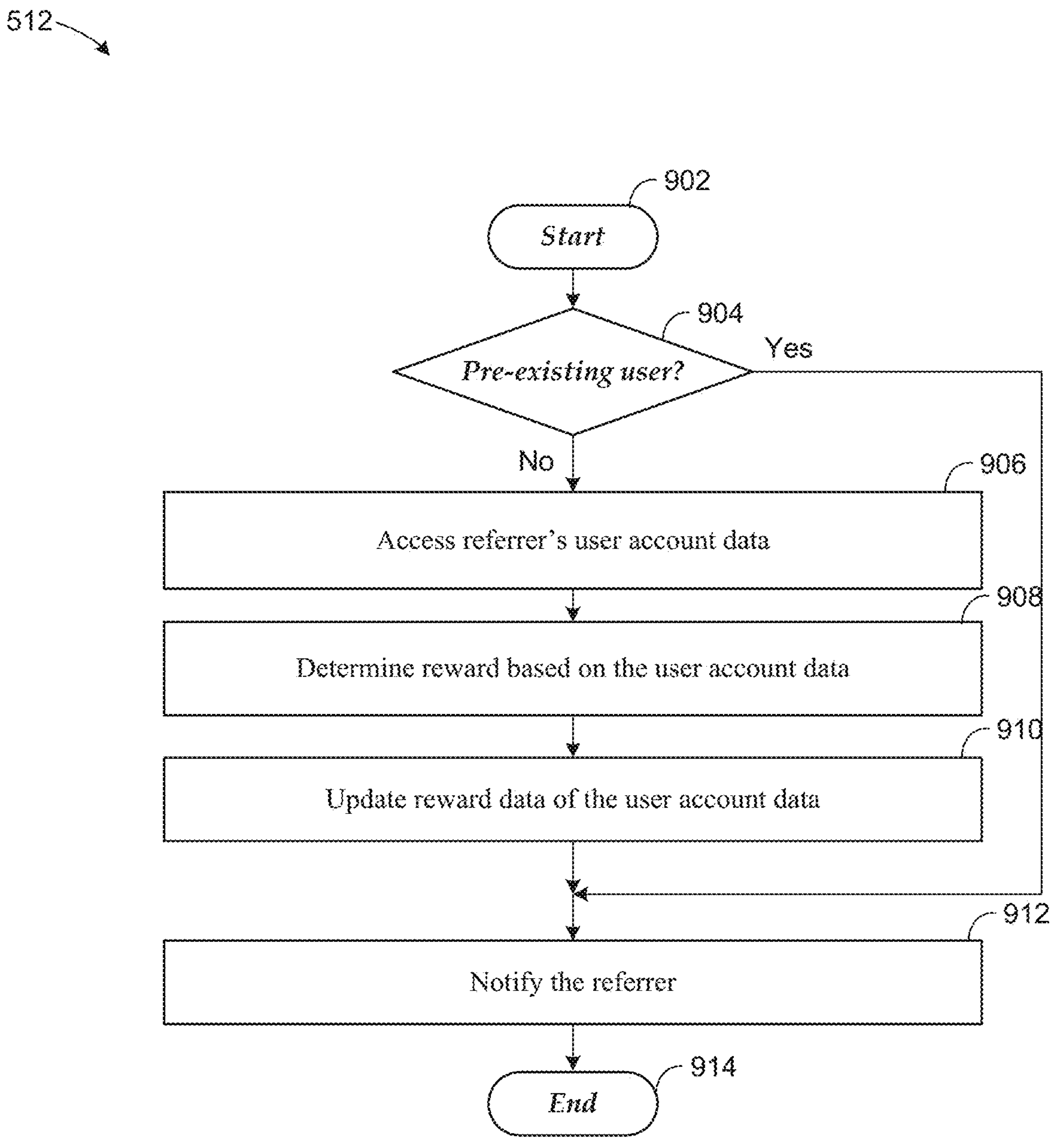
FIG. 9 is a flowchart illustrating an example method of an example process for providing a reward to a referral.

FIG. 9 is a flowchart illustrating an example method 512 of an example process for providing a reward to a referral. In this example, the method 512 may include operations such as determining whether a referred user is a pre-existing user 904, accessing the referrer's user account data 906, determining a reward based on the user account data 908, updating the reward data of the user account data 910, and notifying the referrer 912. The example method 512 will be described, by example, as being performed by certain modules. It will be appreciated, however, that the operations of the example method 512 can be performed by any number of the modules shown in FIG. 2.

The method 512 can start at block 902 and proceed to the block 904 for determining whether the referred user is a pre-existing user. For example, the reward module 210 can be used determine whether the referred user has an existing account, whether it be active or inactive. In one embodiment, the reward module can be configured to query the accounts module 206 in order to make the determination of whether the referred user has a pre-existing account. If the referred user has a pre-existing account, the reward module 210 can be configured to provide no reward to the referrer. Accordingly, in the illustrated method 512 of FIG. 9, the method 512 can proceed to block 912 if the referred user is a pre-existing user.

If the referred user did not have a previous user account, the reward module 210 can be configured to provide the first user (e.g., referrer) a reward, as will be described in further detail below in connection with blocks 906-908.

At block 906, if it is determined that the referred user is not a pre-existing user, the method 512 includes accessing the referrer's user account data. For example, the accounts module 206 can provide the referrer's user account data to the reward module 210. In one embodiment, the user account data can correspond to the data structure 400 of FIG. 4. In particular, the data structure can include a reward data field 406 for storing past rewards amount. For example, the total amount of rewards that a subscriber may receive from referrals over time may be limited. Accordingly, the reward data may be used to record the history of rewards provided to the subscriber so that the rewards to the subscriber can be limited.

At block 908, the method 512 includes determining a reward based on the user account data accessed at block 906. For example, the rewards module may determine the reward based at least on the reward data of the referrer's user account. For example, a reward may be provided to the referrer if the past amount of rewards is below a limit. Otherwise, if the past reward amount is greater than about a limit, then the reward module may provide the referrer no further reward. Additionally, the reward module may provide a reward amount that decreases for new referrals. In this way, a limit can be achieved in a gradual manner. Similarly, the rewards can increase for a number of subsequent referrals (e.g., increasing for each of the first five referrals, and then decrease for every referral afterwards).

At block 910, the method 512 updates the reward data of the user account data. For example, the reward module can be configured to update the reward data of the data structure of the referrer's user account data in order to account for the reward determined at block 908.

At block 912, the method 512 notifies the referrer. For example, the message generator module 208 configured to provide the referrer a text message notifying the referrer of the reward. For example, if the referred user was not a pre-existing user in a reward was determined at block 908 than the text message would notify the referrer of such a reward. Additionally, that notification can provide the referrer of any conditions on the reward, for example, time limits or expiration dates. Alternatively, the notification could provide the referrer a notice that no reward was given due to, for example, either the referred user was a pre-existing user or that the referrer has exceeded the limit for rewards.

Text Message Retargeting

Figure 10:
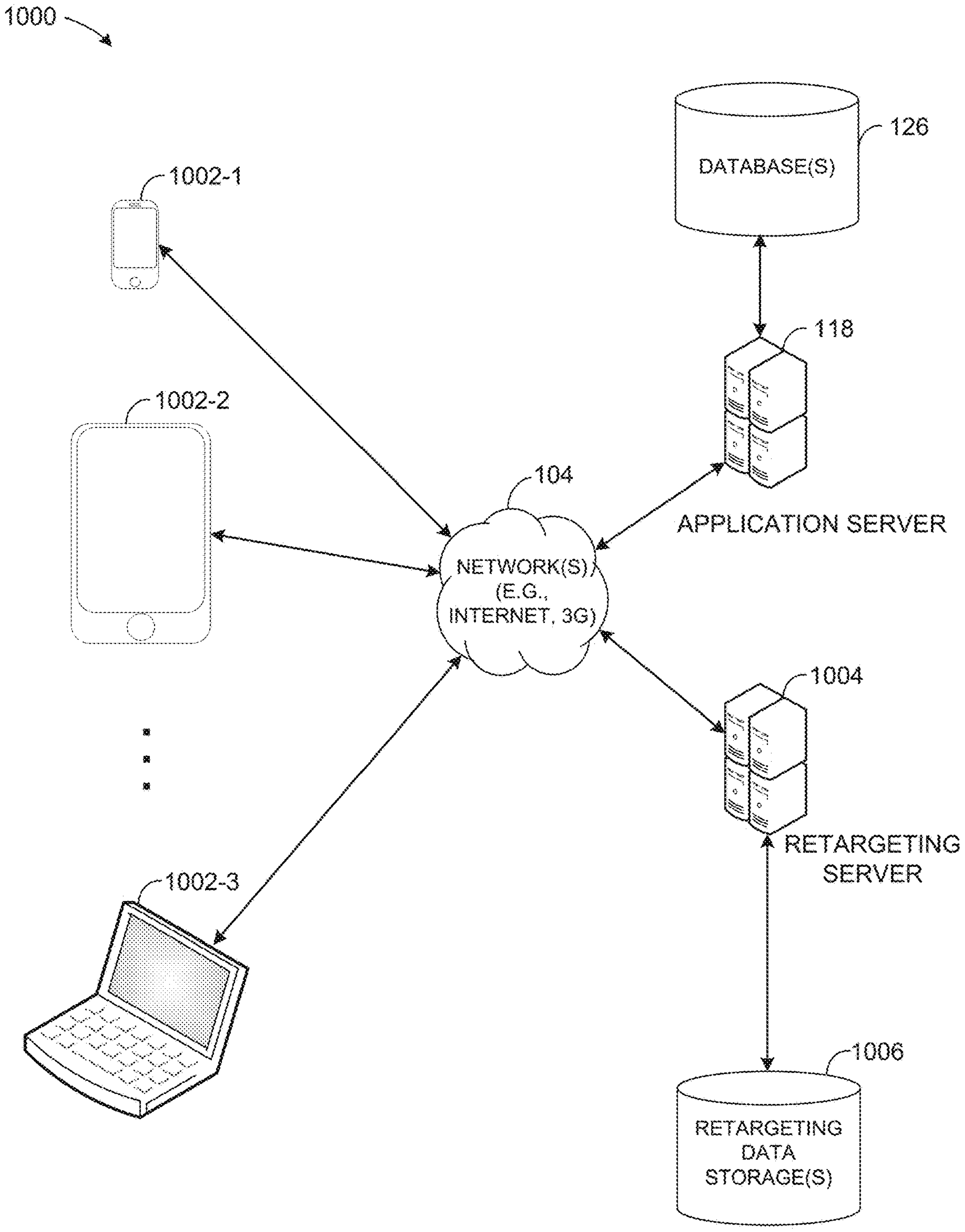
FIG. 10 is a network diagram depicting a client-server system, within which one example embodiment may be deployed for providing retargeting of text message alerts.

FIG. 10 is a network diagram depicting a client-server system 1000, within which one example embodiment may be deployed for providing retargeting of text message alerts. The illustrated client-server system 1000 of FIG. 10 includes one or more user devices 1002-1, 1002-2, 1002-3, an application server 118, and a retargeting server 1004 interconnected by a network 104. Moreover, the application server 118 can be operatively coupled to one or more databases 126, and the retargeting server 1004 can be operatively coupled to one or more retargeting data storage devices 1006. In the illustrated example, the application server 118 and the retargeting server 1004 can form a network-based marketplace or publication system to provide server-side functionality via the network 104 (e.g., the Internet, Wide Area Network (WAN), telephony communication network) to one or more clients (e.g., user devices 1002-1, 1002-2, 1002-3). FIG. 10 illustrates, for example, the user devices can correspond to a mobile phone (e.g., user device 1002-1), a tablet computing device (e.g., user device 1002-2), a laptop or desktop computer (e.g., user device 1002-3), or the like computing devices (not shown). The user devices 1002-1, 1002-2, 1002-3 can represent the devices of one user, or multiple users. The application server 118 and the database 126 can correspond to the elements of FIG. 1 sharing common reference indicia. It will be appreciated that in some embodiments the modules and functionality of the retargeting server 1004 can be implemented as part of the application server 118.

The retargeting server 1004 and the retargeting data storage device 1006 can form a network-based retargeting system to provide server-side functionality via the network 104. For example the retargeting server 1004 can include the retargeting module 212 of FIG. 2 for providing real-time data collection, retargeting logic, dynamically publishing text message based alerts, and interfacing with a communication application for providing text message based alerts to one or more the user devices 1002-1, 1002-2, 1002-3.

In addition, the retargeting data storage device 1006 can store a plurality of accounts for supporting the retargeting functionality of the retargeting server 1004. For example the retargeting data storage device 1006 can store one or more subscriber accounts that each contains data used to provide targeted text messages to the users and the corresponding user devices 1002-1, 1002-2, 1002-3. Each subscriber account can store a phone number in a tracking ID associated with one or more devices of the corresponding user. Examples of tracking IDs include cookie IDs and device IDs. These IDs can be used to map user browser activities to the subscriber account (and telephone number) associated with the user.

Furthermore, the retargeting data storage device 1006 can store plurality of seller accounts. In one embodiment, a seller account can include a seller ID as well as one or more alerts. For example, a seller may provide the retargeting server 1004 one or more candidate alerts to provide to subscribers. During operation, the retargeting server 1004 can be configured to select, based on received browser activity, one of the candidate alerts to be sent to one or more subscribers.

In operation of one example embodiment, users can subscribe or opt in to receiving text message alerts of for example offers, sales, discounts, product listings, and the like. The effectiveness of the text message alerts may be improved by targeting subscribers with alerts that are related to the subscribers' browser activities. For example, the subscribers' browser activity may be indicative of the subscribers' interests. By providing targeted text messages, a subscriber may receive text messages that are more likely to interest the subscriber and, as a result, are more likely to lead to a sale.

In one aspect of various embodiments described herein, tracking data (e.g., browser activity) are provided to the retargeting server 1004 by various web beacons. One example of a web beacon is a cookie that is placed on a user device (e.g., user devices 1002-1, 1002-2, 1002-3) when the subscriber opts in to receive text message alerts. The cookie can be provided to the user device by a tracking pixel of a webpage used in the opt-in process. The tracking pixel can place the cookie in response to various actions, such as the tracking pixel rendering on the user device. The tracking cookie can be configured to provide the retargeting server activity data and a cookie ID to map to the telephone number of the user. Accordingly, the retargeting server 1004 can associate received activity data with a subscriber account based on the cookie ID. It will be appreciated by one skilled in the art that other web beacons, such as web resources based on device IDs, can also be used for providing tracking information.

Figure 11:
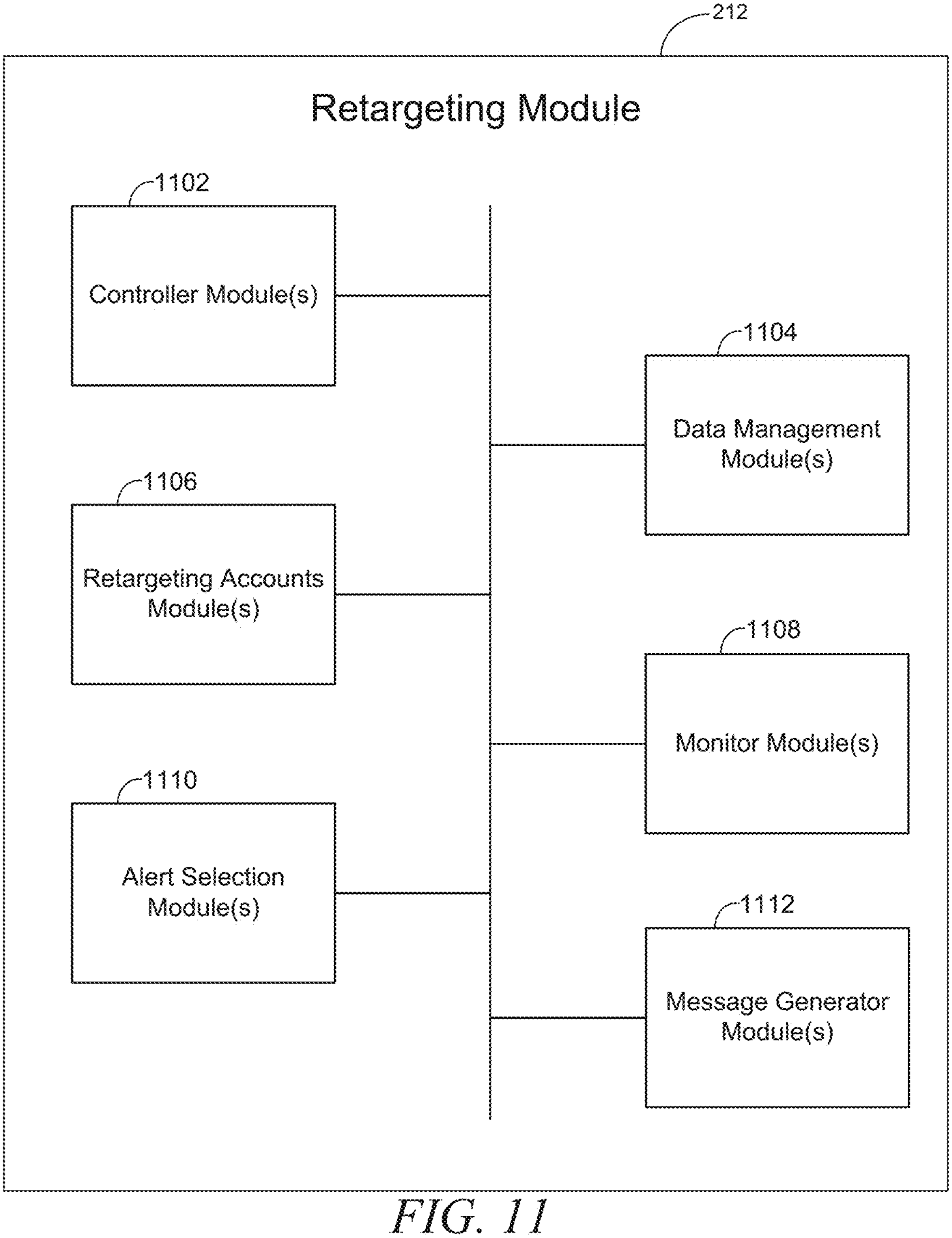
FIG. 11 is a block diagram illustrating an example embodiment of multiple modules forming at least a portion of the retargeting application, which are provided as part of the client-server system.

FIG. 11 is a block diagram illustrating an example embodiment of multiple modules 1102-1112 forming at least a portion of the retargeting module 212. The modules 1102-1112 of the illustrated retargeting module 212 include one or more of each of a controller module 1102, a data management module 1104, a retargeting accounts module 1106, a monitor module 1108, an alert selection module 1110, and a message generator module 1112.

The modules 1102-1112 of retargeting module 212 may be hosted on dedicated or shared server machines (not shown) that are communicatively coupled to enable communications between server machines. Each of the modules 1102-1112 are communicatively coupled (e.g., via appropriate interfaces) to each other and to various data sources, so as to allow information to be passed between the modules 1102-1112 of the retargeting module 212 or so as to allow the modules 1102-1112 to share and access common data. The various modules of the retargeting module 212 may furthermore access one or more data storage devices 1006.

The retargeting module 212, as stated, may provide users text message notifications of product offers, sales, discounts, listings, and/or pricing by subscribing to text-message based notifications. Aspects of the offers, sales, and prices can be based at least on browser activity of the user. For example, an alert may be determined based on matching the browser activity of the user to a product or class of products for sale.

To this end, the retargeting module 212 is shown to include the controller module 1102 and the data management module 1104 communicatively coupled to the retargeting accounts module 1106, the monitor module 1108, the alert selection module 1110, and the message generator module 1112, which together can serve to provide text-message-based notifications. The controller module 1102 can be configured to control the operation of the various modules 1104-1112 as well as the flow of information, data, and/or signals between the modules 1102-1112. In turn, the data management module 1104 is configured to facilitate the flow of the information, data, and/or signals between the modules 1102-1112. In addition, the data management module 1104 can be configured to support communication between the retargeting module 212 and the network 104 and/or the data storage device 1006 of FIG. 10.

The retargeting accounts module 1106 can be configured to access one or more databases to retrieve data used to determine whether or not to transmit a text message. For example, a database can include accounts ("subscriber accounts") of subscribers who have subscribed to receive text message alerts from a seller. Each of the subscriber accounts can include a telephone number to which the communication module is to transmit text messages. In addition, each subscriber account can include data that indicates whether the subscriber has authorized (e.g., by express written authorization) the seller to send the subscriber text messages, and whether or not the authorization is currently active.

Furthermore, each of the subscriber accounts can include one or more restrictions defining and/or qualifying the authorized sending of text messages. Restrictions may include a threshold or limit as to the number of text messages that may be sent over a specified period of time. As an illustrative non-limiting example, the subscriber can specify to receive up to about five text messages per month. Other restrictions include restrictions related to, for example, product types (e.g., clothing, sporting goods, electronics, media, etc.), time of day, parental controls, and the like.

Additionally or alternatively, each of the subscriber accounts of the database can include a record of at least a partial history of text messages sent to the respective phone number. For example, the subscriber accounts can include the number of text messages sent to the respective subscriber over a period of time. In this way, it can be determined whether a new text message may be sent to the respective subscriber in view of restrictions on the frequency of text messages. For example, where the subscriber has limited the number of text messages to five text messages per month, the subscriber account can include the number of text messages sent during the last month. Accordingly, to determine whether not a text message may be sent to the subscriber, the retargeting accounts module 1106 can access the respective subscriber account and compare the one a more restrictions in the at least partial history of text messages sent to the respective phone number, As another non-limiting example, the subscriber accounts can include a history of the products or product types previously offered to the subscriber. In this way, the retargeting accounts module 1106 can be used to determine new alerts to be sent to the subscriber by avoiding alerts that have previously been sent to the subscriber or that are similar to alerts previously sent to the subscriber. As such, the text message may have a higher likelihood of resulting in a sale, as well as keeping the subscriber's interest (opposed to, e.g., frustrating the subscriber with multiple similar alerts).

Moreover, the retargeting accounts module 1106 can be configured to access one or more databases to retrieve data used to determine particular alerts to be provided in the text message. For example, a seller providing the text messages can have stored one or more candidate alerts. The particular alerts selected from the one or more candidate alerts can be based at least on a subscriber's online browser activities. For example, if the retargeting module 212 receives data indicative of the subscriber visiting websites related to sneakers, then the retargeting module 212 can send the subscriber an alert selected from the one or more candidate alerts that relate to sneakers. The seller can update the candidate alerts over time dynamically in order to provide subscribers the up-to-date alerts.

The monitor module 1108 can be configured to receive activity data indicative of online browser activity of a subscriber. Online activities can include visiting a website or webpage, hovering over a webpage object, clicking on a webpage object, and the like action indicative of user interest. Moreover, the activity data can include an identifier (e.g., cookie ID, device ID, an IP address, telephone number, or other identification data) of the user and/or user device. In one embodiment, identifier can result from the user logging into an online account.

In one embodiment, the monitor module 1108 receives activity data from a web beacon, such as tracking pixels and/or cookies, configured to provide tracking information to the retargeting module 212 from the user's device. After the activity data is received, the monitor module 1108 can determine whether the online browser activity was performed by a subscriber of text messages. For example, the monitor module 1108 can compare the identifier of the activity data to the one or more subscriber accounts, which also include identifiers (e.g., contact ID 402 of FIG. 4). If a subscriber account matches the identifier, then the activity data is related to the corresponding subscriber.

The activity data can be associated with various devices. For example, in one aspect, the subscriber authorizes to receive text messages on a mobile telephone. The retargeting module 212 tracks browser activities performed on the mobile telephone, and then determines a text message to send to the subscriber based at least partly on the tracked browser activities.

In another embodiment, the retargeting module 212 may also track browser activities of the subscriber on one or more of the subscriber's other devices. For example, the online browser activity can include activities performed with any suitable network-enabled computing device, such as the tablet computing device, a laptop, a desktop, and the like computers. Thus, while the subscriber has authorized text messages to be sent to the subscriber's mobile telephone, data related to the subscriber's activities on, for example, the subscriber's desktop computer can be used to determine a text message alert to send to the subscriber's mobile telephone.

In one embodiment, the monitor module 1108 is further configured to receive data ("response data") indicative of a response by a recipient of the transmitted text message. For example, the monitor module 1108 can receive response data that indicates that a text message was sent to a subscriber and thereafter the subscriber purchased a product offered in the text message. The response data in some cases may be a result of the subscriber purchasing a product directly from the text message. For example in one embodiment, the text message may include a hyperlink to a webpage for purchasing a product. Moreover, the hyperlink may be configured to provide response data to the retargeting module 212 in order to indicate that the subscriber clicked on the hyperlink and made the purchase.

Accordingly, the accounts module 1106 can be configured to update the corresponding subscriber accounts based on the response data. Such tracking can be useful for providing feedback of the effectiveness of the text message alerts. Additionally, future alerts can be selected based at least partly on the response data. Furthermore, such tracking can be useful for determining subscribers who respond positively to the text messages. This information can be useful in later marketing activities.

The selection module 1110 can be configured to determine an alert by selecting from one or more alerts. For example, the selection module 1110 can receive activity data associated with a subscriber from the monitor module 1108. In addition, the selection module 1110 can access one or more candidate alerts via the retargeting accounts module 1106. Accordingly, selection module 1110 can match the activity data to one of the one or more candidate alerts. The matching can be based on, for example, product type. As a non-limiting illustration, the selection module 1110 may select an offer for bicycle of the seller if the activity data indicates that the subscriber is interested in bicycles. In addition, the selection module 1110 can be configured to base the selection upon a determination of an interest level of the subscriber. For example, if the subscriber has spent a substantial amount of time browsing bicycles, the selection module 1110 can determine that the subscriber has a high interest in bicycles and thus biased the selection towards offers related to bicycles. In this way, if the subscribers browsing activities relate to two or more of the sellers alerts, the selection module 1110 can compare the estimated interest level for each and select an alert associated with a high interest, so as to increase the likelihood of the text message alert resulting in a sale.

In another embodiment, the selection module 1110 can be configured to determine that no text message alerts should be sent. For example, the selection module 1110 can be configured to determine a similarity of the browser activity to the products associated with the candidate alerts. If the similarity is below a predetermined threshold, then the selection module 1110 can be configured to not send a text message based on the current received activity data. Additionally or alternatively, if the activity data indicates that the subscriber does not have high interest (e.g., below a predetermined threshold) in a product associated the candidate alerts, then the selection module 1110 can be configured to not send a text message based on the activity data. Accordingly, some embodiments of the selection module 1110 may have an advantage, among others, of increasing the likelihood of success of a text message and reducing the likelihood of irritating subscribers.

In some embodiments, the selection module 1110 can be configured to determine whether or not a text message is authorized to be sent to the subscriber. For example, the selection module 1110 can be configured to check whether or not the subscriber has provided authorization for text messaging. To do so, the selection module 1110 can access a subscriber account via the accounts module 1106 to determine whether or not the subscriber has provided the authorization. Furthermore, the selection module 1110 can be configured to check whether not the text message is authorized to be sent based on other restrictions. For example, in one embodiment, the selection module 1110 compares the number of text messages sent to the telephone number (e.g., as recorded in the corresponding subscriber account) and a predetermined threshold (e.g., as recorded in the corresponding subscriber account). As stated, example restrictions include restrictions on the time, frequency, duration, and the like considerations. Other example restrictions include restrictions based on the type of product offered type of the text messaging, parental-control, and the like.

If sending the text message is authorized and the selected candidate alert does not violate any of the restrictions, then the text message may be sent. Accordingly, the selection module 1110 can be configured to update the database of subscriber accounts to indicate that the determined alert has been provided. In this way, the frequency of text messaging can be tracked. Additionally, sending multiple text messages for the same alert can be avoided.

The message generator module 1112 configured to generate a text message alert based at least on the alert determined at block 1110. The text message alert may be sent in accordance with a short message service telecommunication system. The text message alert can be transmitted to the telephone number of the subscriber.

As stated, it can be beneficial to track the response of the subscribers to the text message alerts that are sent to the subscribers. To this end, the message generator module 1112 can be configured to generate a hyperlink included in the text message alert. The hyperlink can configured to generate response data indicative of the subscriber's response. For example, response data can be generated by creating a unique hyperlink for the text message so that it can be determined whether the user clicks on the hyperlink, as previously described above.

Figure 12:
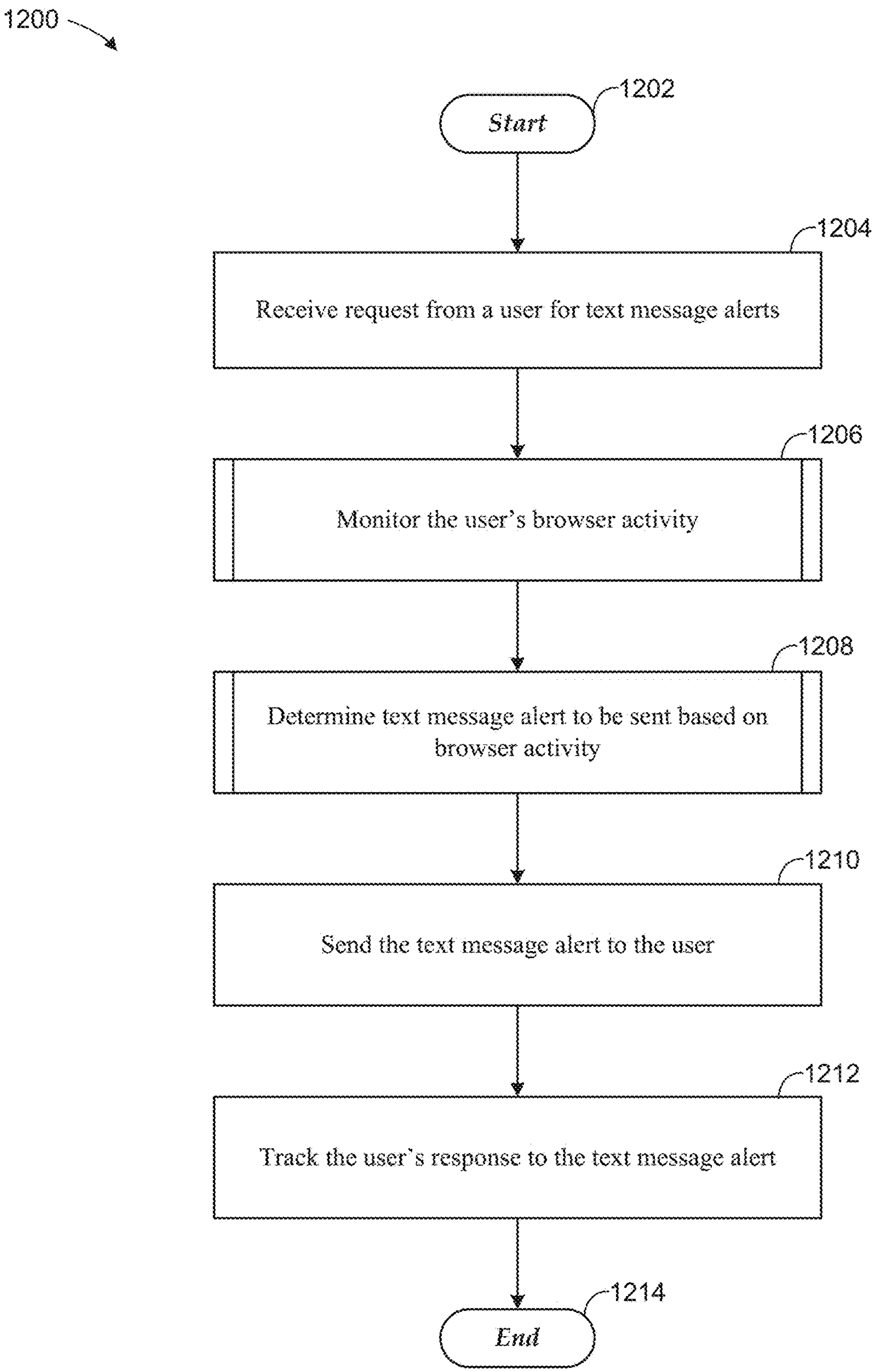
FIG. 12 is a flowchart illustrating an example method of an example process for generating an alert by text message based on retargeting.

FIG. 12 is a flowchart illustrating an example method 1200 of an example process for generating a text message alert based on retargeting. In this example, the method 1200 may include operations such as receiving requests for text message alert 1204, monitoring browser activity 1206, determining text messages based on the browser activity 1208, sending the text message alert 1210, and tracking the user's response to the text message alert 1212.

The method 1200 starts at block 1202 and proceeds to block 1204 for receiving a request from a user for text message alerts. For example, the user may subscribe or opt in to receive alerts by text messages. The user may specify various restrictions on the text messaging, including the frequency and/or duration of the text messaging. A corresponding subscriber account can be stored in a database, such as the database 126 of FIGS. 1 and 10. The process of creating and storing subscriber accounts can be provided by the accounts module 206 of FIG. 2 and/or the retargeting accounts module 1106 of FIG. 11.

The method 1200 proceeds to block 1206 for monitoring the user's browser activity. For example, activity data can be received from a web beacon for providing an indication of browser activity, such as spending time on a particular webpage, hovering a mouse cursor over a webpage object for a period of time, clicking or otherwise activating a webpage object, and the like interactions with a webpage.

The activity data can also include identification data providing an indication of the identity of the user who performed the action. As will be described in greater detail below in connection with FIG. 14, the identification data can be used to determine whether the received activity data is associated with user who subscribed at block 1204.

At block 1208, the method 1200 determines a text message alert to be sent based on the browser activity. For example, an alert can be selected from one or more candidate alerts based on matching the browser activity with the selected alert. In one embodiment, the selection module 1110 can provide the determination of the alert to be sent as a text message alert. The block 1208 of the method 1200 will be described in greater detail later in connection with FIG. 15.

After the text message alert is determined, the method 1200 proceeds to block 1210 for transmitting or sending the text message alert to the user who subscribed to receive text message alerts at block 1204. For example, the text message can be provided to the communication application 123 of FIG. 1 for transmitting, e.g., as a short message service text to the telephone number recorded in the subscriber account of the user who requested text message alerts. In one embodiment, the communication application 123 receives the text message from the selection module 1110 and then transmits the text message to the user over the network 104.

Figure 13:
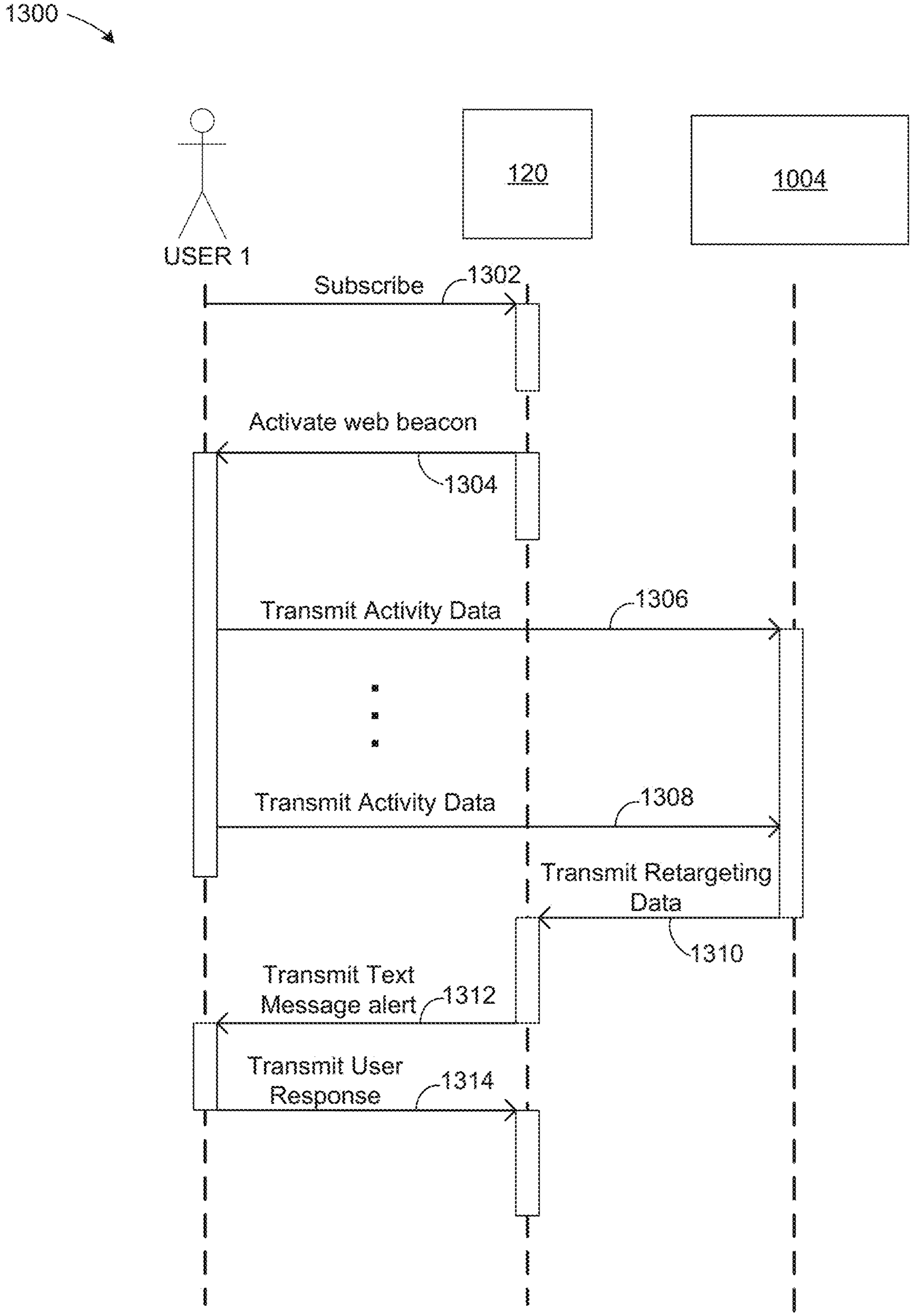
FIG. 13 is an interaction diagram illustrating an example use case of method 1200.

FIG. 13 is an interaction diagram illustrating an example use case of method 1200. The interaction diagram involves multiple interactions between a User 1, a marketplace application 120, and a retargeting server 1004.

At operation 1302, User 1 initiations the process to subscribe to receive text message alerts from the marketplace 120, as described in connection FIGS. 5 and 6. At operation 1304, the marketplace application 120 activates a web beacon in order to track browser activity of User 1. The web beacon may track User 1's activity on a webpage of the marketplace application 120. In some embodiments, the marketplace application provides User 1 with a browser cookie that includes code that captures and provides activity data to the retargeting module 212 of the retargeting server 1004.

After a web beacon is activated, at operations 1306-1308, User 1 transmits one or more sets of activity data and the retargeting module 212 receives the activity data. The retargeting module 212 can receive the activity data with the monitor module 1108 via the communication application 123 of FIG. 1 and/or the data management module 1104 of FIG. 11.

In response, at operation 1310 the retargeting module 212 can transmit retargeting data to the marketplace application 120. In one embodiment, the retargeting data includes a text message to be sent to User 1. For example, the retargeting module 212 can provide the communication application 123 of FIG. 1 the text message alert that was generated based on the transmitted activity data of operations 1306 through 1308. The communication application 123 of FIG. 1 can then transmit the text message alert to the user, e.g., using a telecommunication channel, such as short message service communication.

In another embodiment, the retargeting data corresponds to data generated by performing one or more analytics based at least partly on the one or more transmitted activity data of operations 1306 through 1308. In one embodiment, the data of the analytics can correspond to information that summarizes the transmitted activity data. For example, the summary can provide a list of potential products that the User 1 has shown or indicated interest in through User 1's browser activities. In some embodiments, the list comprises one or more categories of products (or more specific problem products) rate in the order of interest indicated by the activity data. Alternatively, the summary data can include a list of one or more users who may be interested in a certain product or alert. The marketplace application 120, in turn, can then use the retargeting data to match the retargeting data to one or more products or alerts.

Additionally or alternatively, the retargeting data can be used to dynamically and/or automatically generate new types of alerts. For example, the retargeting data received by the marketplace application 120 can indicate that User 1 has shown interest in bicycles. Furthermore, the marketplace application 120 can search one or more inventories to determine the current inventory of bicycles, and based on the determined inventory, determine a price at which to offer User 1 for a bicycle.

Upon selection of an alert, the marketplace application 120 generates a text message and using the communication application 123 of FIG. 1 transmits the text message to User 1 at operation 1312.

At operations 1314, if the user responds to the text message, response data related to User 1's response is transmitted to the marketplace application 120. One example user response that can trigger operation 1314 is the user clicking on a hypertext of the text message alert and then buying a product that is related to the text message alert. This type of data can be useful in providing marketing feedback to identify the efficacy of particular alerts, as well as determine whether a particular user, or an aggregate of the users, is interested in text message alerts.

Figure 14:
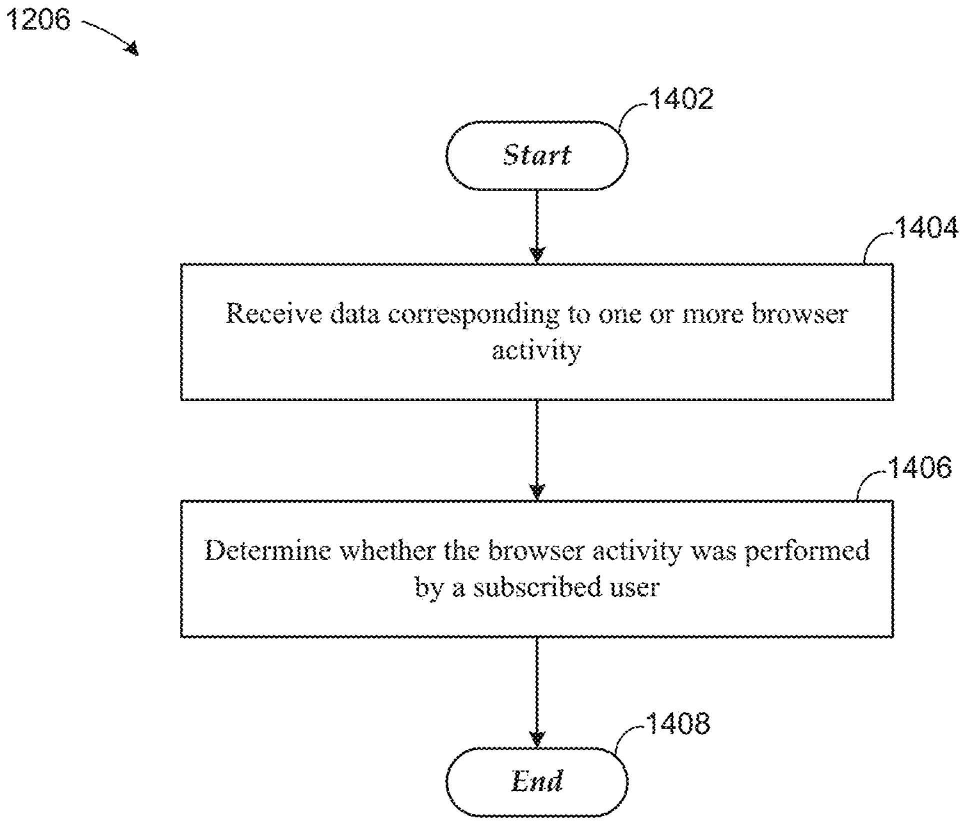
FIG. 14 is a flowchart illustrating an example method of an example process for monitoring browser activity.

FIG. 14 is a flowchart illustrating an example method 1206 of an example process for monitoring browser activity. In this example, the method 1206 may include operations such as receiving data corresponding to one or more browser activities 1404 and determining whether the browser committees are performed by a subscribed user 1406.

The method 1206 starts at block 1402 and proceeds to block 1404 for receiving data corresponding to one or more browser activities. The data can be provided, for instance, by a web beacon such as a cookie stored on the user's device or by various tracks and pixels of a webpage. The data can include an indicator of the user performing the one or more browser activities. In one embodiment, the provided data can be received by the monitor module 1108 of FIG. 11.

Once the data of one or more browser activities are received, the method 1206 proceeds to block 1406 for determining whether the browser activities were performed by a subscribed user. Moreover, at block 1406, the method 1206 determines which particular subscribed user is associated with the received data. In one embodiment, the monitor module 1108 of FIG. 11 matches the indicator to a subscriber account of the data storage device 1006. For example, the retargeting accounts module 1106 can query the database of account based on the indicator of the received activity data. If the indicator matches an account, the accounts module 1106 can provide the subscriber data of the account to the monitor module 1108. In one embodiment, subscriber account includes a subscriber identification data field. After it is determined whether the browser activity performed by a subscribed user, the method 1206 proceeds to block 1408 to end.

Figure 15:
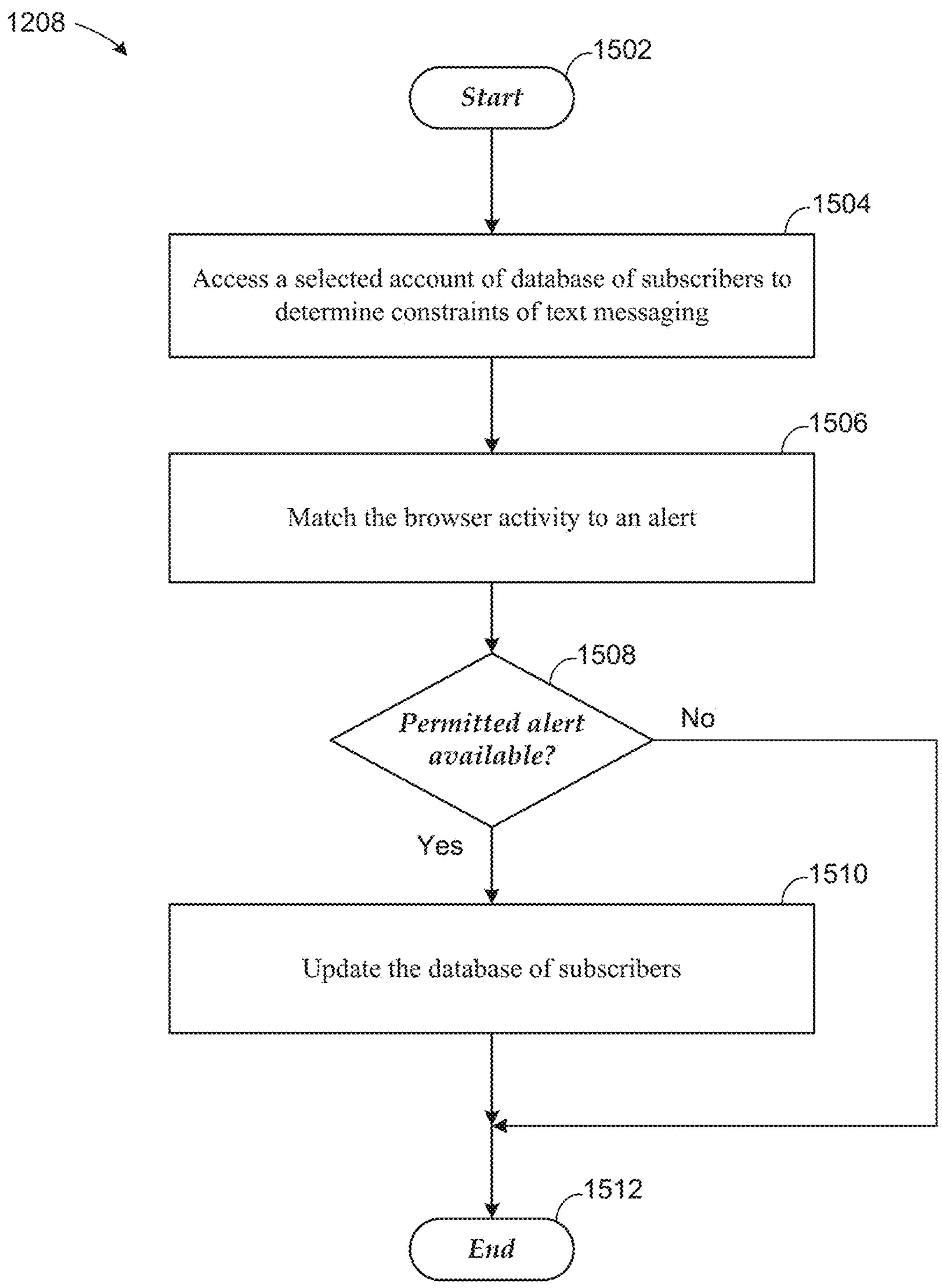
FIG. 15 is a flowchart illustrating an example method of an example process for determining text message alerts to be sent based on browser activity.

FIG. 15 is a flowchart illustrating an example method 1208 of an example process for determining text message alerts to be sent based on browser activity. In this example, the method 1208 may include operations such as accessing a database of subscribers 1504, matching an alert from a plurality of alerts 1506, testing whether a permitted alert is available 1508, and updating the database of subscribers 1510.

The method 1208 starts at block 1502 and proceed to 1504 for accessing a database of subscribers. For example, the method 1208 can access a subscriber account of a database, the subscriber account corresponding to a subscriber identified at block 1206 of FIG. 12. The subscriber account can contain one or more data fields, such as data fields similar to the data fields described in connection with the user account 400 of FIG. 4. In particular, the data structure of an example subscriber account may include data fields indicative of a personal ID, authorization to send text messages, message constraints (e.g., limits on message frequency, time of day, subscription duration, product types, and the like), history of text messages, and history of purchases, among others.

In addition, block 1504 also includes determining whether sending the subscribed user a text message is permitted. For example, sending a text message may be permitted if the subscriber has authorized text messaging and if sending a text message would meet (e.g., not violate) the message constraints as provided by the corresponding subscriber account. Accordingly, one or more data fields of the subscriber account can be accessed to determine whether the associated subscriber has authorized text messaging and whether sending a text message would not violate a message constraint. If such a text message is not permitted, then the method 1208 can end, as will be described below in connection with block 1508.

At block 1506, the method 1208 can include matching an alert from a plurality of alerts. As stated, in one embodiment, the selection module 1110 can be configured to access a database of alerts and to match the activity data collected by the monitor module 1108 to one of the alerts of the database. In one embodiment, particular actions are assigned to match certain alerts. For example, the example user action of clicking on a product image object of a webpage and not purchasing the imaged product can trigger an alert of a sale on the product, and the alert can be sent as a text message to the user. In one embodiment, the text message can be sent at some predetermined time from the action (e.g., about a week after the user action).

In one embodiment, the marketplace application 120 can be configured to provide the retargeting module 212 a plurality of candidate alerts from which alerts can be selected and sent to subscribers in a targeted manner. To this end, the selection module 1110 can select one of the candidate alerts based on an interest determined based at least partly on the received activity data of the monitor module 1108—e.g., selecting a particular candidate bicycle offer based at least on an indication of an interest in bicycles (e.g., as indicated by multiple activities related to bicycle-themed webpages). In one embodiment, each candidate alert is selected based on one or more specific user actions, and a predetermined action is assigned to a particular candidate alert. For example, a candidate alert can be selected if a particular target pixel is activated.

In other embodiments, certain actions and candidate alerts are matched together dynamically. For example, actions are not predeterminedly assigned to a particular candidate alert. Instead, for example, block 1506 includes determining a level or closeness of a match and comparing the closeness of the match to a predetermined threshold. A strong or close match can be determined if, for example, the activity data includes a comparatively large percentage of the aspects of candidate alert, and whereas a weak or distant match can be determined if, for example, the activity data includes a comparatively small percentage of the aspects of candidate alert. For example, activity data may result in a strong or close match to candidate alerts related to bicycles if the activity data includes data related to visiting various webpages and websites related to bicycles. An example of candidate alerts resulting in comparatively weaker matches are alerts related to jewelries having bicycle designs. An example of candidate alerts resulting in still weaker matches are candidate alerts related to jewelries not substantially related to bicycles. Dynamic matching can provide independence and flexibility between the marketplace application 120 and the retargeting module 212. Furthermore, using a threshold on the closeness of the matching can inhibit sending irrelevant or even annoying text messages to subscribers.

Accordingly, at block 1506, the method 1208 may include determining a closeness of a match between the activity data and one or more candidate alerts by comparing the activity data to aspects of the candidate alerts. In addition, in some embodiments, one or more matches may be ranked, and the highest ranked alert (e.g., as determined in accordance with block 1504) can be selected. Furthermore, the closeness of the matches can be compared to a predetermined threshold, and those candidate alerts above the threshold can be available for providing to the subscribed user.

The method can proceed from block 1506 to block 1508 for determining whether any permitted alerts are available. Permitted alerts can include a candidate alert that is authorized as discussed above in connection with block 1504. Additionally, available alerts can include candidate alerts that match the activity data above the predetermined threshold, as described above in connection with block 1506. If the associated subscriber has authorized text messaging and sending a text message would not violate a message constraint, then the method 1208 can continue to block 1510 for updating the database of subscriber accounts; otherwise, the method 1208 can end at block 1512.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 16:
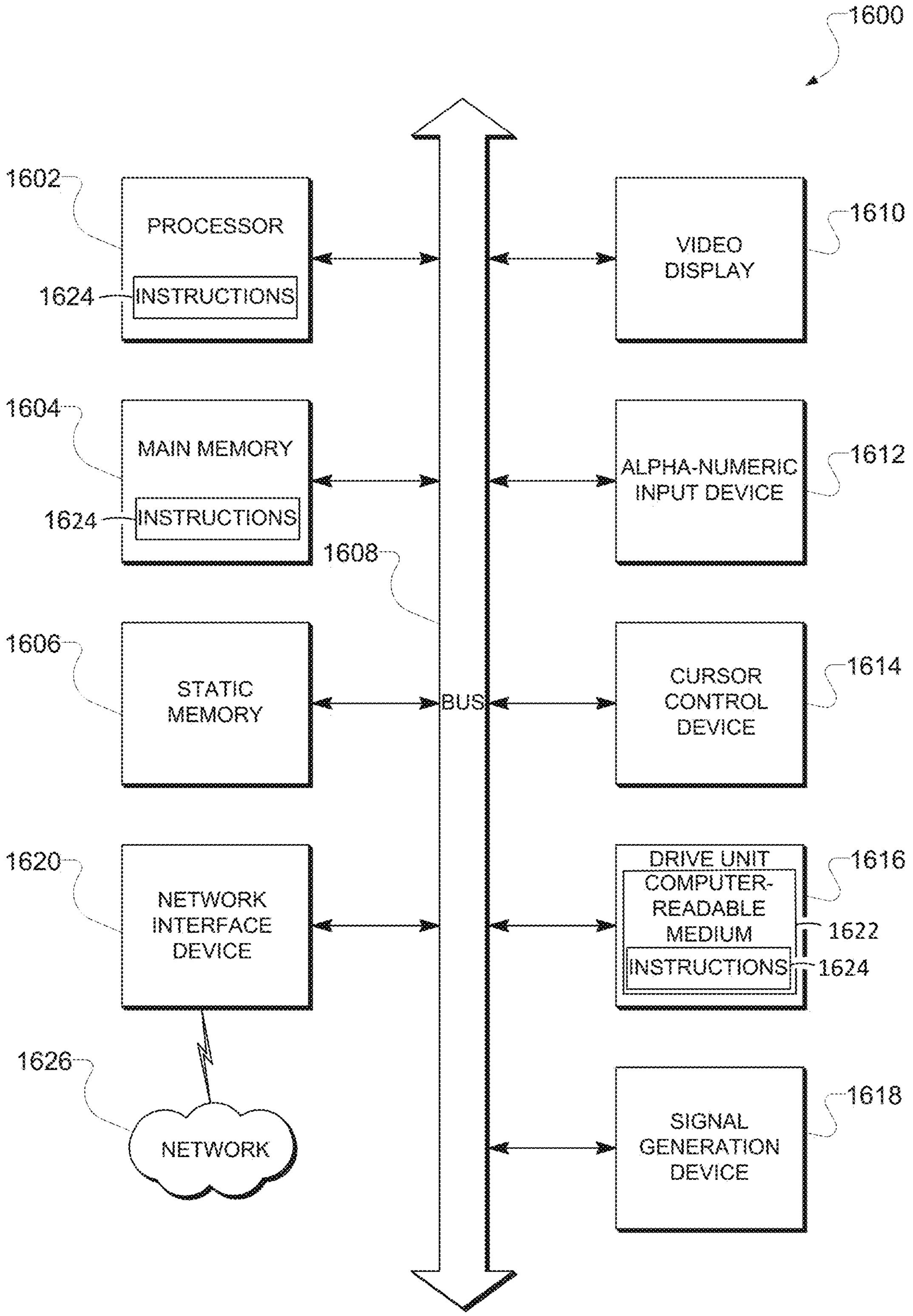
FIG. 16 is a block diagram of machine in the example form of a computer system within which instructions, for causing the machine to perform any one or more of the methodologies discussed herein, may be executed.

FIG. 16 is a block diagram of machine in the example form of a computer system 1600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard or a touch-sensitive display screen), a user interface (UI) navigation device 1614 (e.g., a mouse), a disk drive unit 1616, a signal generation device 1618 (e.g., a speaker) and a network interface device 1620.

Machine-Readable Medium

The disk drive unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any non-transitory, tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A system comprising:

one or more hardware processors; and a non-transitory machine-readable medium for storing instructions that, when executed by the one or more hardware processors, cause the one or more hardware processors to perform operations comprising:

receiving first user data from a first client device associated with a first user, the first user data including an indicator that the first user requested to subscribe to receive message alerts;

adding, based on the first user data, a first user account associated with the first user to a database of subscribers;

tracking online activity of one or more users;

determining, based on the first user account, that a portion of the online activity is associated with the first user;

generating, automatically after the determining, a first message corresponding to an offer to subscribe to receive message alerts, the first message comprising, within the message, a first message portion and a second message portion, the first message portion being personalized to a second user, the second message portion having a request to subscribe to receive message alerts;

transmitting the first message to the first client device, the first message being configured to be forwarded to a third client device, the third client device associated with the second user;

receiving, in response to activation of a hyperlink in the first message, second user data from the third client device, the hyperlink comprising a portion of the second user data, the second user data including an indicator that the second user requested to subscribe to receive message alerts based on the first message transmitted to the first client device associated with the first user, and an indicator that the first user referred the second user; and adding a second user account to the database of subscribers to receive message alerts, the second user account including the second user data.

2. The system of claim 1, wherein the indicator that the first user referred the second user includes contact data associated with the first user.

3. The system of claim 1, wherein the operations further comprise:

accessing reward data of the first user account in response to receiving the second user data;

determining a reward based on the first user data of the first user account; and updating the reward data of the first user account based on the determined reward.

4. The system of claim 3, wherein the operations further comprise:

generating a second message providing a notification of the determined reward; and transmitting the second message to the first device associated with the first user.

5. The system of claim 3, wherein the operations further comprise:

determining that the second user account was added to the database of subscribers based on receiving the second user data; and providing the second user a reward based on a determination that the second user account was added to the database of subscribers based on the second user data.

6. The system of claim 3, wherein the reward is further determined based on the second user data.

7. The system of claim 1, wherein the first user data includes contact data associated with the first user, and wherein the operations further comprise:

transmitting the first message to a particular client device corresponding to the contact data associated with the first user.

8. The system of claim 1, wherein the operations further comprise:

in response to receiving the first user data, adding the first user account to the database of subscribers by:

determining account information based on parsing the received user data;

verifying that the first user data includes written authorization to send messages to the first device associated with the first user; and storing the account information in a record of the database based on a verification that the first user data includes written authorization to send messages to the first device associated with the first user.

9. The system of claim 1, wherein the operations further comprise:

generating a second message in response to receiving the first user data, the second message indicating an acknowledgement that the first user account has been added; and transmitting the second message to the first client device associated with the first user.

10. The system of claim 1, wherein the operations further comprise:

determining a hyperlink that is associated with a web resource for adding accounts to the database of subscribers; and including the hyperlink in the first message.

11. The system of claim 10, wherein the hyperlink is configured to provide an indication to the web resource that the first user referred the second user.

12. A method for providing electronic notifications, the method comprising:

receiving first user data from a first client device associated with a first user, the first user data including an indicator that the first user requested to subscribe to receive message alerts;

adding, based on the first user data, a first user account associated with the first user to a database of subscribers;

tracking online activity of one or more users;

determining, based on the first user account, that a portion of the online activity is associated with the first user;

generating, automatically after the determining, a first message corresponding to an offer to subscribe to receive message alerts, the first message comprising, within the message, a first message portion and a second message portion, the first message portion being personalized to a second user, the second message portion having a request to subscribe to receive message alerts;

transmitting the first message to the first client device, the first message being configured to be forwarded to a third client device, the third client device associated with the second user;

receiving, in response to activation of a hyperlink in the first message, second user data from the third client device, the hyperlink comprising a portion of the second user data, the second user data including an indicator that the second user requested to subscribe to receive message alerts based on the first message transmitted to the first client device associated with the first user, and an indicator that the first user referred the second user; and adding a second user account to the database of subscribers to receive message alerts, the second user account including the second user data.

13. The method of claim 12, further comprising:

accessing reward data of the first user account in response to receiving the second user data;

determining a reward based on the first user data of the first user account; and updating the reward data of the first user account based on the determined reward.

14. The method of claim 13, further comprising:

generating a second message providing a notification of the determined reward; and transmitting the second message to the first client device associated with the first user.

15. The method of claim 14, further comprising:

determining that the second user account was added to the database of subscribers based on receiving the second user data; and providing the second user a reward based on a determination that the second user account was added to the database of subscribers based on the second user data.

16. A non-transitory machine-readable storage medium comprising instructions that, when executed by one or more hardware processors of a machine, cause the one or more hardware processors to perform operations comprising:

receiving first user data from a first client device associated with a first user, the first user data including an indicator that the first user requested to subscribe to receive message alerts;

adding, based on the first user data, a first user account associated with the first user to a database of subscribers;

tracking online activity of one or more users;

determining, based on the first user account, that a portion of the online activity is associated with the first user;

generating, automatically after the determining, a first message corresponding to an offer to subscribe to receive message alerts, the first message comprising, within the message, a first message portion and a second message portion, the first message portion being personalized to a second user, the second message portion having a request to subscribe to receive message alerts;

transmitting the first message to the first client device, the first message being configured to be forwarded to a third client device, the third client device associated with the second user;

receiving, in response to activation of a hyperlink in the first message, second user data from the third client device, the hyperlink comprising a portion of the second user data, the second user data including an indicator that the second user requested to subscribe to receive message alerts based on the first message transmitted to the first client device associated with the first user, and an indicator that the first user referred the second user; and adding a second user account to the database of subscribers to receive message alerts, the second user account including the second user data.

17. The non-transitory machine-readable storage medium of claim 16, wherein the operations further comprise:

accessing reward data of the first user account in response to receiving the second user data;

determining a reward based on the first user data of the first user account; and updating the reward data of the first user account based on the determined reward.

* * * * *